(12) United States Patent
Makino et al.

(10) Patent No.: US 8,669,025 B2
(45) Date of Patent: Mar. 11, 2014

(54) POLYMERIZABLE COMPOSITION, CURED FILM, COLOR FILTER, METHOD OF PRODUCING COLOR FILTER AND SOLID-STATE IMAGE SENSOR

(75) Inventors: Masaomi Makino, Haibara-gun (JP); Kazuya Oota, Haibara-gun (JP); Yushi Kaneko, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 296 days.

(21) Appl. No.: 13/113,249

(22) Filed: May 23, 2011

(65) Prior Publication Data

US 2011/0294049 A1 Dec. 1, 2011

(30) Foreign Application Priority Data

May 31, 2010 (JP) ................. 2010-124667

(51) Int. Cl.
  *G02B 5/20* (2006.01)
  *G03F 7/004* (2006.01)
  *H01L 27/14* (2006.01)

(52) U.S. Cl.
  USPC ............................ 430/7; 430/270.1; 257/440

(58) Field of Classification Search
  None
  See application file for complete search history.

(56) References Cited

U.S. PATENT DOCUMENTS

| 4,255,513 A | 3/1981 | Laridon et al. |
| 4,590,145 A | 5/1986 | Itoh et al. |
| 2009/0038834 A1 | 2/2009 | Itoh et al. |

FOREIGN PATENT DOCUMENTS

| EP | 1 887 425 A1 | 2/2008 |
| JP | 2000-80068 A | 3/2000 |
| JP | 2001-233842 A | 8/2001 |
| JP | 2004-010697 A * | 1/2004 |
| JP | 3610626 B2 | 1/2005 |
| JP | 2005-202252 A | 7/2005 |
| JP | 2006-342166 A | 12/2006 |
| JP | 2007-269779 A | 10/2007 |
| JP | 2009-191061 A | 8/2009 |

OTHER PUBLICATIONS

Computer-generated translation of JP 2004-010697 (Jan. 2004).*
Communication, dated Aug. 19, 2011, issued in corresponding EP Application No. 11167436.2, 5 pages.

* cited by examiner

*Primary Examiner* — John A. McPherson
(74) *Attorney, Agent, or Firm* — Sughrue Mion, PLLC

(57) ABSTRACT

The invention provides a polymerizable composition including an oxime ester photopolymerization initiator, an organic acid anhydride having a molecular weight of 300 or less, and a polymerizable compound.

20 Claims, No Drawings

POLYMERIZABLE COMPOSITION, CURED FILM, COLOR FILTER, METHOD OF PRODUCING COLOR FILTER AND SOLID-STATE IMAGE SENSOR

CROSS-REFERENCE TO RELATED APPLICATION

This application claims priority under 35 USC 119 from Japanese Patent Application No. 2010-124667 filed May 31, 2010, the disclosure of which is incorporated by reference herein.

TECHNICAL FIELD

The invention relates to a polymerizable composition, a cured film formed from the polymerizable composition, a color filter, a method of producing a color filter and a solid-state image sensor including a color filter.

BACKGROUND ART

There are polymerizable compositions that include, for example, a polymerizable compound having an ethylenically unsaturated bond and a photopolymerization initiator. Since such polymerizable compositions cure when exposed to light, they are used for photocurable inks, photosensitive printing plates, color filters, photoresists and the like.

In recent years, combined with the demand in various applications for polymerizable compositions having sensitivity with respect to a short wavelength light of especially 365 nm, compounds that exhibit excellent sensitivity with respect to a light source of short wavelength, for example, a photopolymerization initiator, have been increasingly desired.

Use of oxime ester derivatives as a photopolymerization initiator in such polymerizable compositions has been proposed (see, for example, U.S. Pat. Nos. 4,255,513 and 4,590,145, Japanese Patent Application Laid-Open (JP-A) Nos. 2000-80068, 2001-233842, 2006-342166 and 2005-202252). However, since these known oxime ester compounds exhibit low absorbance with respect to light having a wavelength of 365 nm, there has been room to improve the exposure sensitivity with respect to light of this wavelength.

In view of the above, novel oxime ester derivatives, which exhibit increased absorbance with respect to short wavelength light of approximately 365 nm, improved sensitivity and favorable stability, have been proposed in recent years (see, for example, JP-A Nos. 2007-269779 and 2009-191061). However, these oxime ester derivatives still have a problem to be solved in terms of temporal stability, due to hydrolysis that occurs at an oxime ester site when these derivatives are used in a highly acidic or basic polymerizable composition.

There is also a strong demand for increasing the color density and reducing the thickness of color filters for image sensors for the purpose of enhancing the light-condensing capability of a solid-state image sensor such as a CCD image sensor or improving the image quality by enhancing the color-separation capability of the solid-state image sensor.

In order to increase the color density, a synergist that can interact with a pigment or a dispersant that can interact with the synergist is used together with the pigment. As an interactive group, an acid-base ionic interaction is generally widely used. When a large amount of acidic or basic substituents are present in the polymerizable composition in order to achieve a high color density, hydrolysis of the oxime ester derivative in the composition may occur and the temporal stability of the polymerizable composition may deteriorate.

Further, when a large amount of a colorant is added in order to achieve a high color density, sensitivity may not be sufficient to precisely reproduce the shape of fine pixel patterns having a size of 2.5 μm or less. As a result, there is a tendency for a lack of patterns to occur frequently in the entire region. In order to prevent the lack of patterns, the light exposure needs to be carried out with energy of a higher level. Therefore, the time for exposure may become longer and decrease in yield of products may be significant.

In consideration of the above, there is a need for polymerizable compositions used for forming a colored region of a color filter that exhibit high curing sensitivity, while containing a colorant and a dispersant at high concentrations, in order to attain an ability of forming a favorable pattern. There is also a need for polymerizable compositions that do not cause hydrolysis of an oxime ester derivative, while containing a dispersant having an acidic or basic substituent, in order to avoid decrease in sensitivity during storage over time.

A method is known in which occurrence of scumming due to residues or the like during a development process to form a color filter by adding an organic carboxylic anhydride having a molecular weight of 800 or less to a photopolymerizable composition for a color filter (see, for example, Japanese Patent No. 3,610,626). However, Japanese Patent No. 3,610,626 does not teach or suggest improving the temporal stability of a polymerizable composition. Therefore, improvement in temporal stability of a polymerizable composition including an oxime ester derivative as an initiator, the composition being capable of forming a highly precise image with high sensitivity, has been demanded.

SUMMARY OF THE INVENTION

According to an aspect of the invention, a polymerizable composition comprising an oxime ester photopolymerization initiator, an organic acid anhydride having a molecular weight of 300 or less, and a polymerizable compound, is provided.

DETAILED DESCRIPTION OF THE INVENTION

In the invention, it is considered that by adding an organic acid anhydride having a molecular weight of 300 or less to a polymerizable composition containing an oxime ester photopolymerization initiator, the water content in the polymerization composition is supplemented by the acid anhydride. As a result, it is considered that hydrolysis of the oxime ester photopolymerization initiator in the polymerizable composition is suppressed and the reduction in sensitivity during storing the polymerizable composition in the form of a liquid over time is suppressed, whereby high sensitivity is maintained.

Further, even if the oxime ester photopolymerization initiator is hydrolyzed to become an oxime, esterification of the oxime is caused due to the presence of the acid anhydride in the polymerizable composition, whereby the oxime restores its state as an oxime ester photopolymerization initiator. Accordingly, it is presumed that reduction in sensitivity during storage of the polymerization composition over time is suppressed and high sensitivity is maintained.

Moreover, it is considered that a cured film having a favorable pattern shape and generates a suppressed amount of residues is obtained as a result of using an organic acid anhydride having a small molecular weight and a low boiling point, such that the acid anhydride evaporates from a layer formed from the polymerizable composition during a prebaking process prior to the exposure.

Oxime ester photopolymerization initiators, when not being neutral, are prone to hydrolysis. In particular, in a polymerizable composition for forming a color filter or the like, hydrolysis of an oxime ester photopolymerization initiator may be encouraged due to the presence of a compound including an acidic group or a basic group, such as a pigment dispersion or a resin for development. In this regard, the polymerizable composition according to the invention does not exhibit reduction in sensitivity during storage over time and cures at high sensitivity. Further, when the polymerization composition is used for forming a colored region of a color filter, it exhibits a favorable pattern formation suitability and a pattern with a suppressed amount of residues at unexposed portion is obtained. Accordingly, the polymerizable composition according to the invention is suitably used for forming a color pattern for color filters, including color filters for solid-state image sensors that require a fine colored pattern.

According to the invention, it is possible to provide a polymerizable composition that exhibits high sensitivity and suppresses hydrolysis of an oxime ester photopolymerization composition used as a photopolymerization initiator, and exhibits favorable storage stability in the form of a liquid and suppressed reduction in sensitivity after the storage over time.

By using the polymerizable composition according to the invention, it is also possible to provide a cured film having a favorable pattern shape, a color filter, a method of producing a color filter, and a solid-state image sensor.

<<Polymerizable Composition>>

The polymerizable composition according to the present invention includes (A) an oxime ester photopolymerization initiator, (B) an organic acid anhydride having a molecular weight of 300 or lower, and (C) a polymerizable compound.

Hereinafter, the components of the polymerizable composition of the invention will be described.

<(A) Oxime Ester Photopolymerization Initiator>

The oxime ester photopolymerization initiator used in the invention is not particularly limited insofar as it has an ability of initiating polymerization of a polymerizable compound, and may be selected as appropriate from known oxime ester photopolymerization initiators.

The oxime ester photopolymerization initiator may be an oxime ester photopolymerization initiator that causes an action of some kind with a photo-excited sensitizer and generates active radicals, or may be an oxime ester photopolymerization initiator that initiates cationic polymerization depending on the monomer type.

The oxime ester photopolymerization initiator preferably includes at least one component having a molecular extinction coefficient of approximately 50 or more in the range of approximately from 200 to 800 nm (more preferably 300 to 500 nm) in order to impart curing properties.

In recent years, not only a mercury lamp or a metal halide lamp but also a monochromatic UV-LED light source is used as a UV light source, typically at a wavelength of 365 nm or 405 nm. Therefore, from the viewpoint of increasing the sensitivity, the molar absorption coefficient of the oxime ester photopolymerization initiator at 365 nm or 405 nm is preferably from 50 to 100,000, more preferably from 100 to 70,000, and particularly preferably from 500 to 50,000.

Examples of the oxime derivatives suitably used as the oxime ester photopolymerization initiator in the invention include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-(4-toluenesulfonyloxy)iminobutan-2-one, and 2-ethoxycarbonyloxyimino-1-phenylpropan-1-one.

Examples of the oxime ester compounds include compounds described in J. C. S. Perkin II (1979) pp. 1653-1660, J. C. S. Perkin II (1979) pp. 156-162, Journal of Photopolymer Science and Technology (1995) pp. 202-232, JP-A No. 2000-66385, JP-A No. 2000-80068, JP-A (Translation of PCT Application) No. 2004-534797, and JP-A No. 2006-342166.

Commercially-available items, including IRGACURE-OXE01, IRGACURE-OXE02, and CGI-325 (all trade names, manufactured by BASF Japan Ltd.) are also suitably used.

In addition; cyclic oxime compounds described in JP-A No. 2007-231000 and JP-A No. 2007-322744 are also suitably used.

Most preferable oxime ester compounds includes oxime compounds having a specific substituent, such as those described in JP-A No. 2007-269779, or oxime compounds having a thioaryl group, such as those described in JP-A No. 2009-191061.

The oxime ester photopolymerization initiator is preferably a compound represented by the following Formula (1).

In Formula (1), $R^1$ represents an aryl group, a heteroaryl group, or an acyl group. $R^2$ represents an alkyl group, an aryl group, a heteroaryl group or an acyl group. $R^3$ represents an alkyl group, an aryl group or an alkoxy group. $R^1$ and $R^2$ may form a ring together with at least one oxygen or sulfur atom and at least one divalent organic group.

In the present specification, the definitions of alkyl group, aryl group, heteroaryl group, alkoxy group and acyl group also include, in addition to the groups not having a substituent, the groups having a substituent unless otherwise specified.

Hereinafter, details of the compound represented by Formula (1) will be described.

In Formula (1), $R^1$ represents an aryl group, a heteroaryl group, or an acyl group.

The aryl group that may have a substituent represented by $R^1$ is preferably an aromatic ring having 6 to 30 carbon atoms, more preferably an aromatic ring having 6 to 20 carbon atoms, and still more preferably an aromatic ring having 6 to 10 carbon atoms.

Specific examples of the aryl group include a phenyl group, a p-methoxyphenyl group, a p-fluorophenyl group, a p-bromophenyl group, a pentafluorophenyl group, a biphenyl group, a 1-naphthyl group, a 2-naphthyl group, a 9-anthryl group, a 9-phenantolyl group, a 1-pyrenyl group, a 5-naphthacenyl group, a 1-indenyl group, a 2-azulenyl group, a 9-fluorenyl group, a terphenyl group, o-, m-, and p-tolyl groups, a xynil group, o-, m- and p-cumenyl groups, a mesityl group, a pentalenyl group, a binaphtalenyl group, a ternaphtalenyl group, a biphenylenyl group, an indacenyl group, a fluoranthenyl group, an acenaphthylenyl group, a fluorenyl group, an anthryl group, a bianthracenyl group, a teranthracenyl group, an anthraquinolyl group, a phenanthryl group, a triphenylenyl group, and a p-triphenylthio group.

Examples of the heteroaryl group that may have a substituent represented by $R^1$ include an aromatic or aliphatic heterocyclic group having a nitrogen atom, an oxygen atom, a sulfur atom or a phosphorus atom. Among these, a carbazolyl group, a thienyl group, a pyridyl group, a furyl group, a pyranyl group and an imidazolyl group are preferable, and a thienyl group, a pyridyl group and a furyl group are more preferable.

The acyl group that may have a substituent represented by $R^1$ is preferably an acyl group having 6 to 30 carbon atoms, more preferably an acyl group having 6 to 20 carbon atoms, and still more preferably an acyl group having 6 to 10 carbon atoms.

Examples of the acyl group include a benzoyl group, a 3-(N-ethylcarbazole) carbonyl group, and a (4-phenylthio) phenylcarbonyl group.

An alkyl group that may have a substituent represented by $R^2$ is preferably an alkyl group having 1 to 30 carbon atoms, more preferably an alkyl group having 1 to 20 carbon atoms, and still more preferably an alkyl group having 1 to 10 carbon atoms.

Specific examples of the alkyl group include a methyl group, an ethyl group, a propyl group, a butyl group, a hexyl group, an octyl group, a decyl group, a dodecyl group, an octadecyl group, an isopropyl group, an isobutyl group, a sec-butyl group, a t-butyl group, a cyclopentyl group, a cyclohexyl group, a trifluoromethyl group, and a 2-ethylhexyl group.

When $R^2$ represents an alkyl group, the alkyl group is more preferably an alkyl group having a substituent. Specific examples of the substituent are included in the following <Group A>.

<Group A> a halogen atom, a cyano group, an aryl group, an alkenyl group, an alkynyl group, —ORa, —SRa, —CONRaRb, —OC(O)NRaRb, —OC(O)Ra, —C(O)ORa, —S(O)Ra, and —S(O)$_2$Ra. Ra and Rb each independently represent a hydrogen atom, an alkyl group, an aryl group, or a heteroaryl group.

When $R^2$ represents an aryl group, a heteroaryl group or an acyl group, preferred examples thereof are the same as that of $R^1$.

When $R^3$ represents an alkyl group, an unsubstituted alkyl group having 1 to 10 carbon atoms is preferable, an unsubstituted alkyl group having 1 to 5 carbon atoms is more preferable, an unsubstituted alkyl group having 1 to 2 carbon atoms is still more preferable, and a methyl group is most preferable.

When $R^3$ represents an aryl group, an unsubstituted aryl group having 6 to 20 carbon atoms is preferable, an unsubstituted aryl group having 6 to 15 carbon atoms is more preferable, an unsubstituted aryl group having 6 to 10 carbon atoms is still more preferable, and a phenyl group is most preferable.

When $R^3$ represents an alkoxy group, an unsubstituted alkoxy group having 1 to 10 carbon atoms is preferable, an unsubstituted alkoxy group having 1 to 5 carbon atoms is more preferable, an unsubstituted alkoxy group having 1 to 2 carbon atoms is still more preferable, and a methoxy group is most preferable.

The compound represented by Formula (1) is preferably further represented by the following Formula (2).

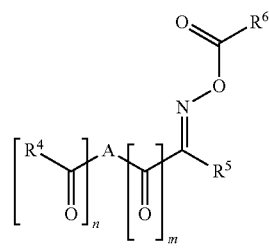

(2)

In Formula (2), A represents an aromatic group or a heteroaromatic group. $R^4$ represents an alkyl group, an aryl group or a heteroaryl group. $R^5$ represents an alkyl group, an aryl group, a heteroaryl group or an acyl group. A and $R^5$ may form a ring together with at least one oxygen or sulfur atom and at least one divalent organic group. $R^6$ represents an alkyl group having carbon atoms of 8 or lower or an aryl group having carbon atoms of 8 or lower. n represents 0 or 1, and m represents 0 or 1.

When A represents an aromatic group, examples thereof include a residual group obtained by removing one hydrogen atom from benzene, naphthalene, anthracene, biphenyl, benzyl, terphenylene, stilbene, diphenyl sulfide, and the like.

When A represents a heteroaromatic group, examples thereof include a residual group obtained by removing one hydrogen atom from N-ethylcarbazole, thioxanthone, and the like.

When $R^4$ represents an alkyl group, an aryl group or a heteroaryl group, preferred examples thereof are the same as those of $R^2$ in Formula (1).

When $R^5$ represents an alkyl group, an aryl group, a heteroaryl group or an acyl group, preferred examples thereof are the same as those of $R^2$ in Formula (1).

$R^6$ represents an alkyl group having carbon atoms of 8 or lower or an aryl group having carbon atoms of 8 or lower, more preferably an alkyl group having 1 to 4 carbon atoms or an aryl group having 6 to 7 carbon atoms, and specific examples thereof include a methyl group and a phenyl group.

The compound represented by Formula (1) is preferably further represented by the following Formula (3) or (4).

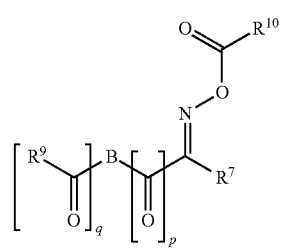

(3)

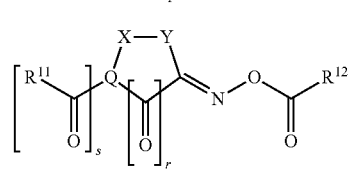

(4)

In Formula (3), $R^7$ represents an alkyl group having a —SAr group. $R^9$ represents an alkyl group, an aryl group or a heteroaryl group. $R^{10}$ represents an alkyl group having carbon atoms of 8 or lower or an aryl group having carbon atoms of 8 or lower. Ar represents an aryl group. B represents a substituent selected from the substituents included in the following <Group B>. p represents 0 or 1, and q represents 0 or 1.

In Formula (4), X represents an oxygen atom or a sulfur atom. Y represents a divalent alkylene group. $R^{11}$ represents an alkyl group, an aryl group or a heteroaryl group. $R^{12}$ represents an alkyl group having carbon atoms of 8 or lower or an aryl group having carbon atoms of 8 or lower. Q represents a substituent obtained by removing one hydrogen atom from any one of the structures included the following <Group B>, and the substituent forms a ring together with X—Y. r represents 0 or 1, and s represents 0 or 1.

In <Group B>, $R^8$ represents an alkyl group or an aryl group.

<Group B>

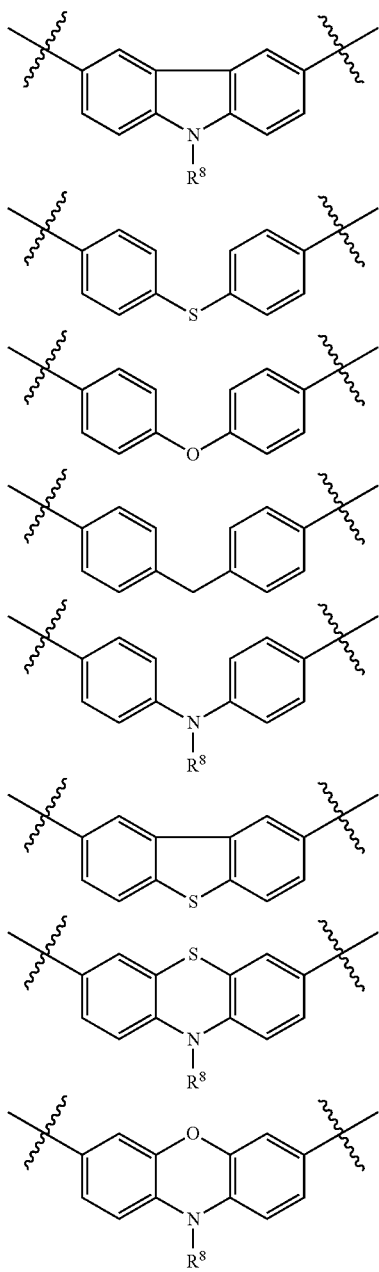

$R^{10}$ represents an alkyl group having carbon atoms of 8 or lower or an aryl group having carbon atoms of 8 or lower and is more preferably an alkyl group having carbon atoms of 1 to 4 or an aryl group having carbon atoms of 6 to 7. Specific examples include a methyl group and a phenyl group.

$R^7$ represents an alkyl group having a —SAr group, and Ar represents an aryl group. Specific examples include a 4-chlorophenylthioethyl group, a 4-bromophenylthioethyl group, a 4-fluorophenylthioethyl group, a 2,6-dimethylphenylthioethyl group, a 4-methylphenylthioethyl group, a 4-methoxyphenylthioethyl group, a 4-chlorophenylthiopropyl group, a 4-bromophenylthiopropyl group, a 4-fluorophenylthiopropyl group, a 2,6-dimethylphenylthiopropyl group, a 4-methylphenylthiopropyl group, and a 4-methoxyphenylthiopropyl group.

The alkyl group that may have a substituent represented by $R^8$ in <Group B> is preferably an alkyl group having 1 to 8 carbon atoms, most preferably an ethyl group.

The aryl group that may have a substituent represented by $R^8$ is preferably an aryl group having 6 to 12 carbon atoms, most preferably a phenyl group.

X in Formula (4) represents an oxygen atom or a sulfur atom. Q represents a substituent obtained by removing one hydrogen atom from any one of the structures included in <Group B>, and the substituent forms a ring together with X—Y. Q is bonded at an arbitrary position of an aromatic ring of any one of the substituents selected from <Group B>.

Y represents a divalent linking group and is preferably an alkylene group having 1 to 10 carbon atoms that may have a substituent, preferably an alkylene group having 1 to 5 carbon atoms that may have a substituent. Specific examples include a methylene group, an ethylene group, a propylene group, an isopropylene group, a butylene group, an isobutylene group, and a sec-butylene group.

The molar absorption coefficient of the oxime ester photopolymerization initiator at 365 nm or 405 nm is preferably from 1,000 to 300,000, more preferably from 5,000 to 300,000, and particularly preferably from 10,000 to 200,000, from the viewpoint of sensitivity.

The molar absorption coefficient of the compound may be measured by a known method. Specifically, for example, the molar absorption coefficient of the compound is preferably measured with an ultraviolet and visible spectrophotometer (trade name: CARRY-5, manufactured by Varian) and an ethyl acetate solvent at a concentration of 0.01 g/L.

The following are specific examples of the oxime ester photopolymerization initiator (exemplary compounds (A-1) to (A-46)) that may be used in the invention, but the invention is not limited to these compounds.

(A-1)

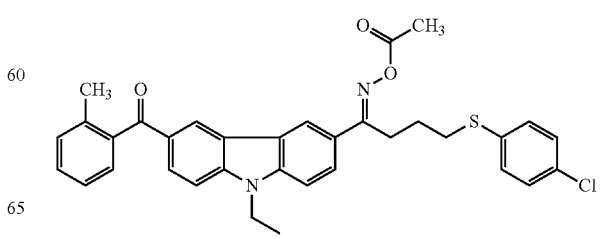

(A-2)
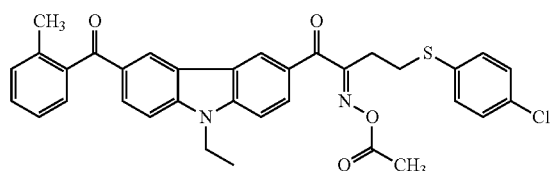
(A-3)
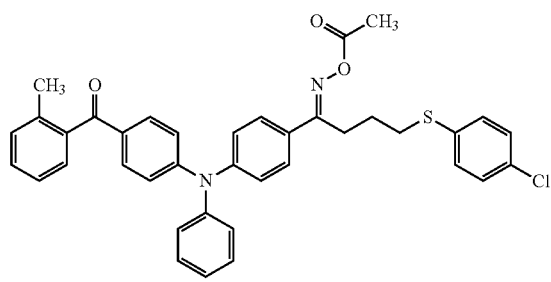
(A-4)
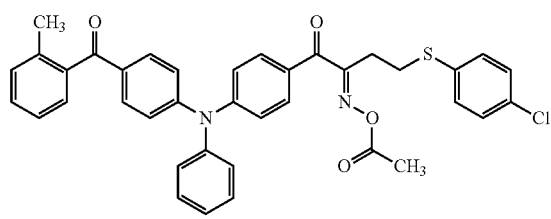
(A-5)
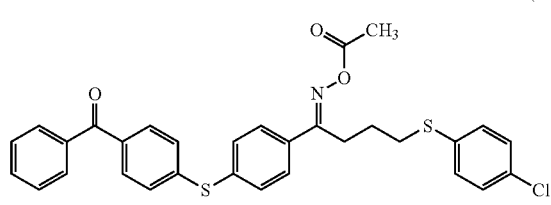
(A-6)
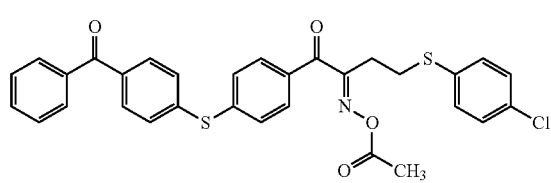
(A-7)
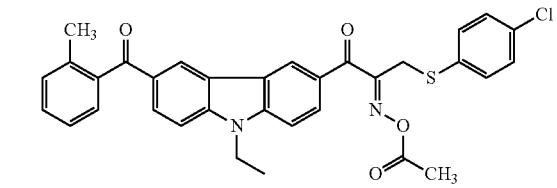
(A-8)
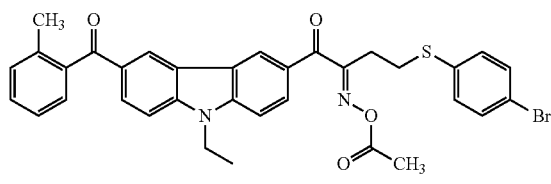
(A-9)
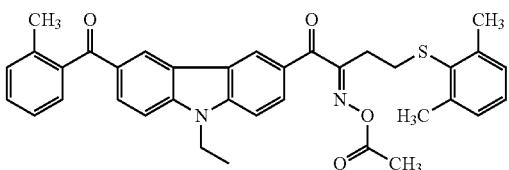
(A-10)
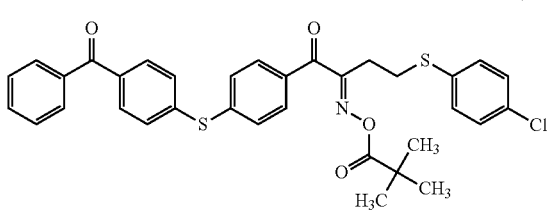
(A-11)
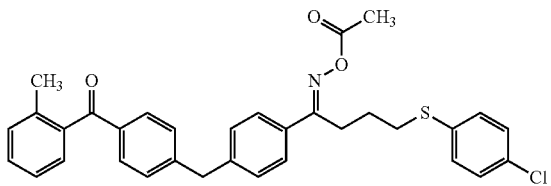
(A-12)
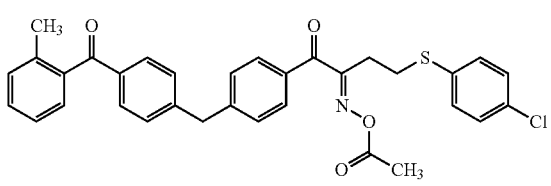
(A-13)
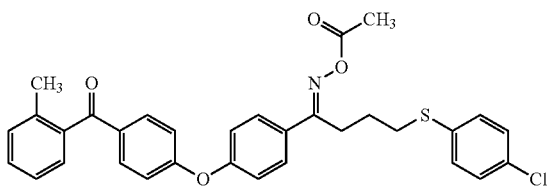
(A-14)
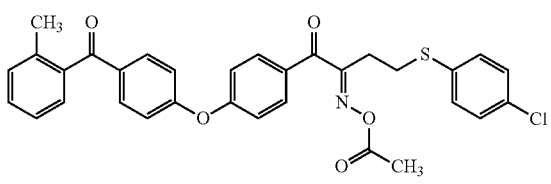
(A-15)
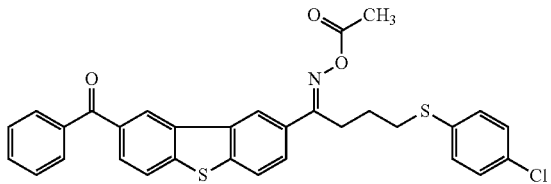

-continued
(A-16)
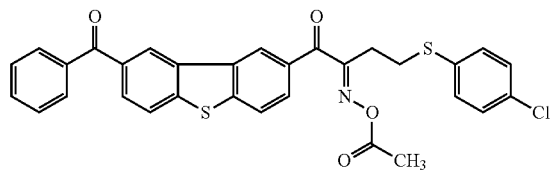
(A-17)
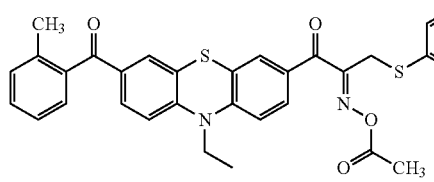
(A-18)
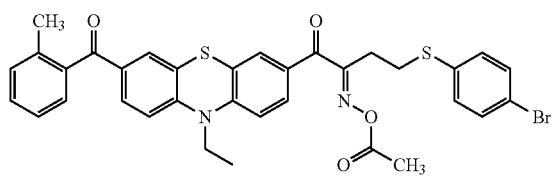
(A-19)
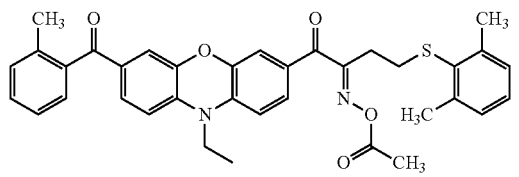
(A-20)
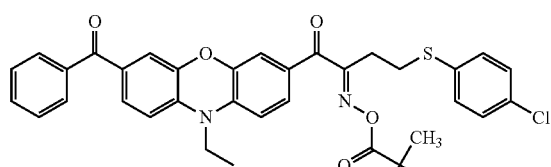
(A-21)
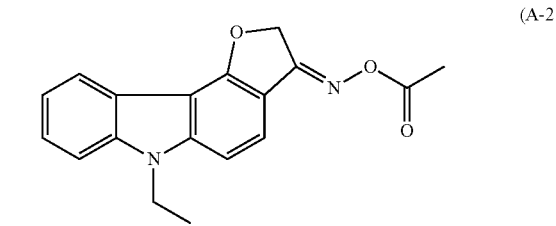
(A-22)
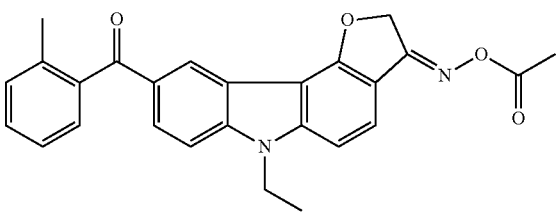
-continued
(A-23)
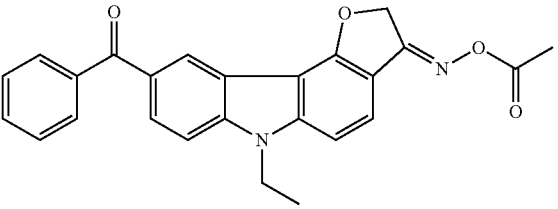
(A-24)
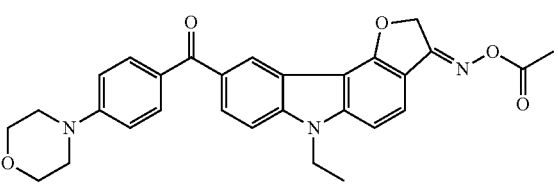
(A-25)
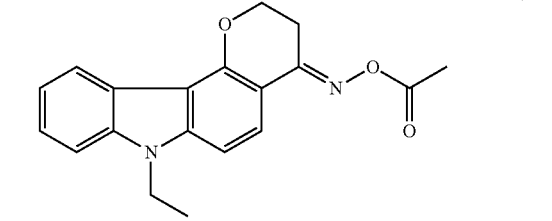
(A-26)
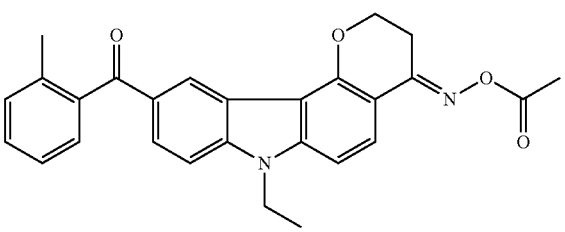
(A-27)
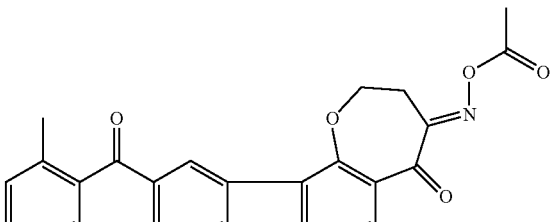
(A-28)
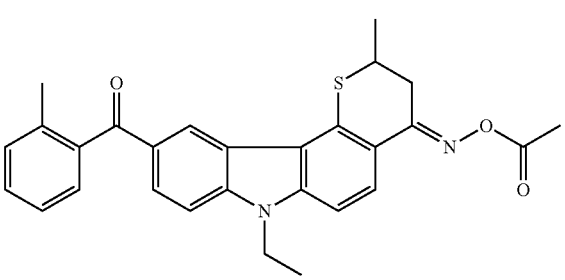

-continued
(A-29)
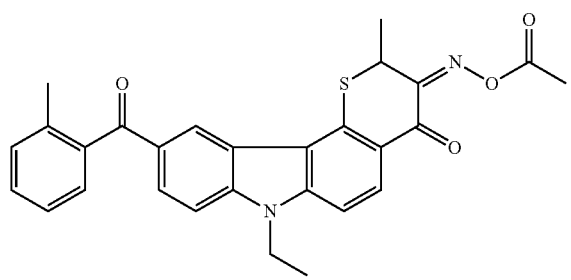
(A-30)
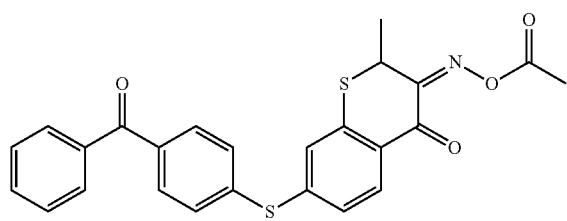
(A-31)
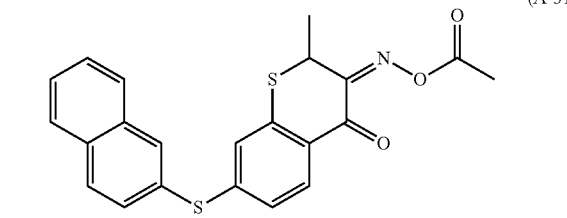
(A-32)
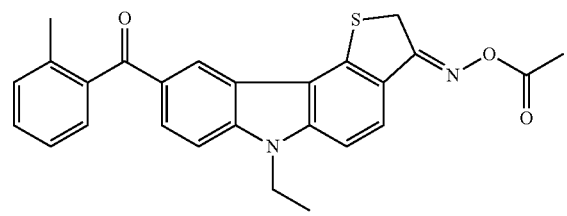
(A-33)
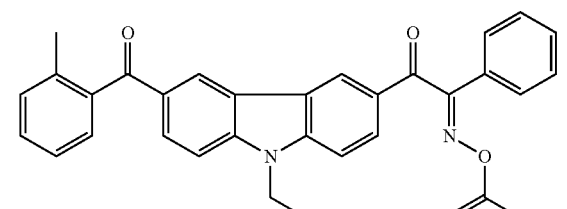
(A-34)
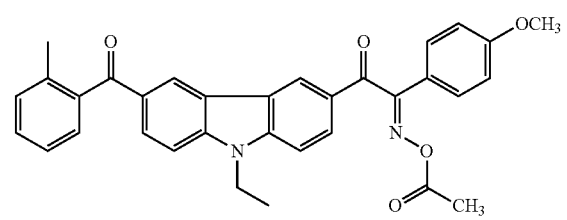
(A-35)
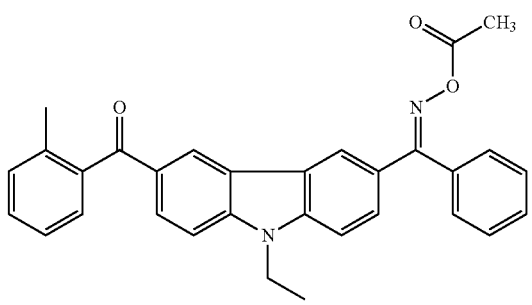
(A-36)
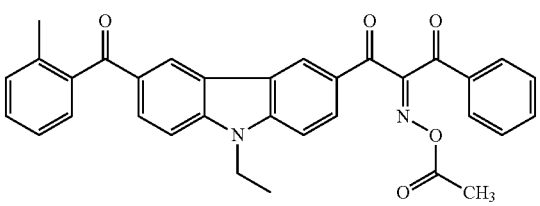
(A-37)
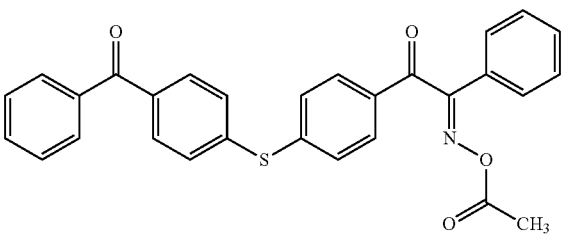
(A-38)
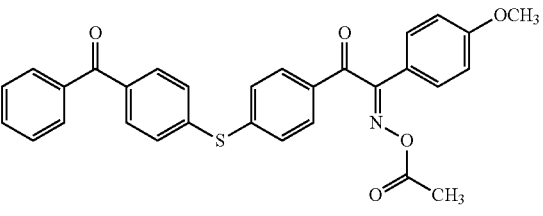
(A-39)
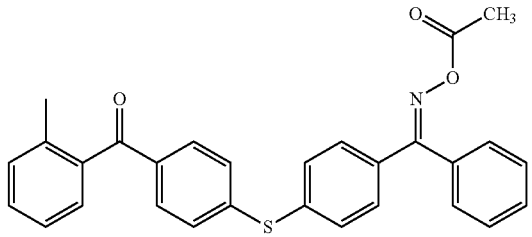
(A-40)
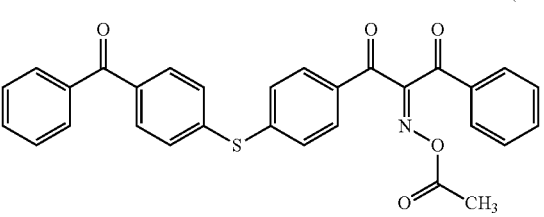

-continued

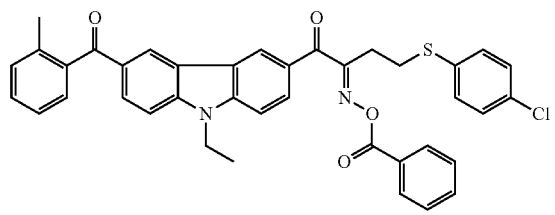
(A-41)

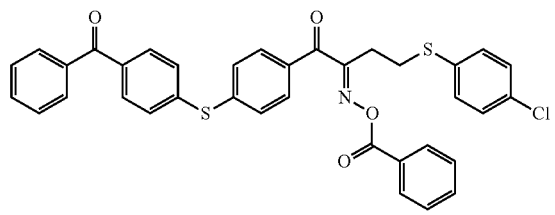
(A-42)

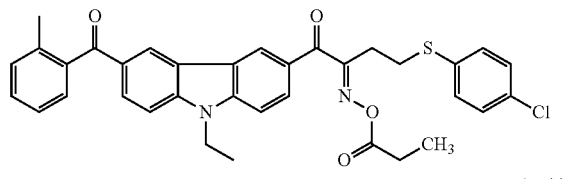
(A-43)

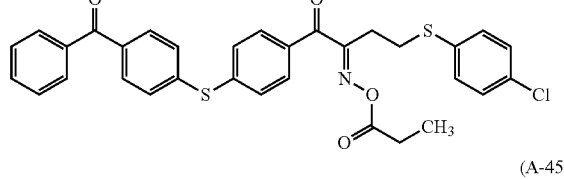
(A-44)

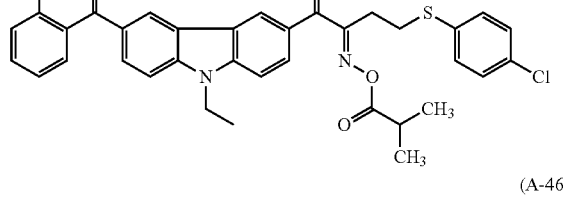
(A-45)

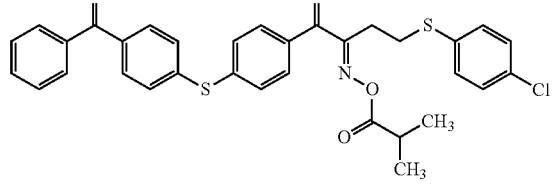
(A-46)

Among these, exemplary compounds (A-1), (A-2), (A-5), (A-6), (A-8)-(A-10), (A-22)-(A-24), (A-27)-(A-32) and (A-40)-(A-46) are preferred; and (A-2), (A-6), (A-8), (A-9), (A-22), (A-24), (A-27), (A-29) and (A-43)-(A-46) are more preferred.

The oxime ester photopolymerization initiator may be used singly or in combination of two or more kinds thereof.

The content of the oxime ester photopolymerization initiator used in the polymerizable composition of the invention may be selected as appropriate according to the purpose and, in general, is preferably 1% by mass to 20% by mass, and more preferably 3% by mass to 15% by mass, with respect to the solid content of the polymerizable composition. In particular, when the oxime ester photopolymerization initiator is used for the formation of a colored region of a color filter, the content is preferably 7% by mass to 15% by mass. When the oxime ester photopolymerization initiator is used for the formation of a color filter of a solid state image sensor, the content is preferably 3% by mass to 20% by mass.

By adjusting the content to be within this range, a cured film that exhibits excellent sensitivity and suppressed reduction in sensitivity with time can be obtained.

In the present specification, the solid content of the polymerizable composition refers to the total content of all components of the polymerizable composition except the solvent constituting the polymerizable composition.

When oxime ester photopolymerization initiators have a carbonyl group at the a position of the oxime structure, reduction in sensitivity with time is particularly significant. Accordingly, the effect of suppressing reduction in sensitivity with time achieved by an organic acid anhydride having a molecular weight of 300 or lower is particularly remarkable when it is combined with an oxime ester photopolymerization initiator having a carbonyl group at the α position of the oxime structure.

The polymerizable composition of the invention may further contain a photopolymerization initiator other than an oxime ester photopolymerization initiator.

Examples of the photopolymerization initiators other than an oxime ester photopolymerization initiator include halogenated hydrocarbon derivatives (e.g., one having a triazine skeleton and one having an oxadiazole skeleton), acylphosphine compounds, such as acylphosphine oxides, hexaarylbiimidazole, organic peroxides, thio compounds, ketone compounds, aromatic onium salts, aminoacetophenone compounds, and hydroxyacetophenone compounds.

Examples of the halogenated hydrocarbon compounds having a triazine skeleton include compounds described in Wakabayashi et. al., "Bull. Chem. Soc. Japan, 42, 2924 (1969)", compounds described in U.K. Patent No. 1388492, compounds described in JP-A No. 53-133428, compounds described in German Patent No. 3337024, compounds described in J. Org. Chem.; 29, 1527 (1964) by F. C. Schaefer et al, compounds described in JP-A No. 62-58241, compounds described in JP-A No. 5-281728, compounds described in JP-A No. 5-34920, and compounds described in U.S. Pat. No. 4,212,976.

Examples of the compounds described in U.S. Pat. No. 4,212,976 include compounds having an oxadiazole skeleton (e.g., 2-trichloromethyl-5-phenyl-1,3,4-oxadiazole, 2-trichloromethyl-5-(4-chlorophenyl)-1,3,4-oxadiazole, 2-trichloromethyl-5-(1-naphthyl)-1,3,4-oxadiazole, 2-trichloromethyl-5-(2-naphthyl)-1,3,4-oxadiazole, 2-tribromomethyl-5-phenyl-1,3,4-oxadiazole, 2-tribromomethyl-5-(2-naphthyl)-1,3,4-oxadiazole; 2-trichloromethyl-5-styryl-1,3,4-oxadiazole, 2-trichloromethyl-5-(4-chlorostyryl)-1,3,4-oxadiazole, 2-trichloromethyl-5-(4-methoxystyryl)-1,3,4-oxadiazole, 2-trichloromethyl-5-(1-naphthyl)-1,3,4-oxadiazole, 2-trichloromethyl-5-(4-n-butoxystyryl)-1,3,4-oxadiazole, and 2-tribromomethyl-5-styryl-1,3,4-oxadiazole.

Examples of the photopolymerization initiators other than the oxime ester photopolymerization initiator include acridine derivatives (e.g., 9-phenylacridine and 1,7-bis(9,9'-acridinyl)heptane), N-phenylglycine and the like, polyhalogenated compounds (e.g., carbon tetrabromide, phenyl tribromomethyl sulfone, and phenyl trichloromethyl ketone); coumarins (e.g., 3-(2-benzofuroyl)-7-diethylaminocoumarin, 3-(2-benzofuroyl)-7-(1-pyrrolidinyl)coumarin, 3- benzoyl-7-diethylaminocoumarin, 3-(2-methoxybenzoyl)-7-diethylaminocoumarin, 3-(4-thmethylaminobenzoyl)-7-diethylaminocoumarin, 3,3'-carbonylbis(5,7-di-n-propoxycoumarin), 3,3'-carbonylbis(7-diethylaminocoumarin), 3-benzoyl-7-methoxy coumarin, 3-(2-furoyl)-7-diethylaminocoumarin, 3-(4-diethylaminocinnamoyl)-7-diethylaminocoumarin, 7-methoxy-3-(3-pyridylcarbonyl)coumarin, 3-benzoyl-5,7-dipropoxycoumarin, 7-benzotriazol-2-yl coumarin, and coumarin compounds described in JP-A Nos. 5-19475, 7-271028, 2002-363206, 2002-363207, 2002-363208, 2002-363209, etc.);

acylphosphine oxides (e.g., bis(2,4,6-trimethylbenzoyl)-phenylphosphine oxide, bis(2,6-dimethoxybenzoyl)-2,4,4-trimethyl-penthyl phenylphosphine oxide, and LUCIRIN TPO);

metallocenes (e.g., bis(η5-2,4-cyclopentadien-1-yl)-bis(2,6-difluoro-3-(1H-pyrrol-1-yl)-phenyl)titanium, and η5-cyclopentadienyl-O-cumenyl-iron (1+)-hexafluorophosphate (1−)); and compounds described in JP-A No. 53-133428, Japanese Examined Patent Publication (JP-B) No. 57-1819, JP-B No. 57-6096, and U.S. Pat. No. 3,615,455.

Examples of the ketone compounds include benzophenone, 2-methylbenzophenone, 3-methylbenzophenone, 4-methylbenzophenone, 4-methoxybenzophenone, 2-chlorobenzophenone, 4-chlorobenzophenone, 4-bromobenzophenone, 2-carboxybenzophenone, 2-ethoxycarbonylbenzophenone, benzophenone tetracarboxylic acid or tetramethyl esters thereof, 4,4'-bis(dialkylamino)benzophenones (e.g., 4,4'-bis(dimethylamino)benzophenone, 4,4'-bis-dicyclohexylamino)benzophenone, 4,4'-bis(diethylamino)benzophenone, 4,4'-bis(dihydroxyethylamino)benzophenone, 4-methoxy-4'-dimethylaminobenzophenone, 4,4'-dimethoxybenzophenone, 4-dimethylaminobenzophenone, 4-dimethylaminoacetophenone, benzil, anthraquinone, 2-t-butylanthraquinone, 2-methylanthraquinone, phenanthraquinone, xanthone, thioxanthone, 2-chloro-thioxanthone, 2,4-diethylthioxanthone, fluorenone, 2-benzyl-dimethylamino-1-(4-morphorinophenyl)-1-butanone, 2-methyl-1-[4-(methylthio)phenyl]-2-morphorino-1-propanone, 2-hydroxy-2-methyl-[4-(1-methylvinyl)phenyl]propanol oligomer, benzoin, benzoin ethers (e.g., benzoin methyl ether, benzoin ethyl ether, benzoin propyl ether, benzoin isopropyl ether, benzoin isophenyl ether, and benzyldimethyl ketal); acridone, chloroacridone, N-methylacridone, N-butylacridone, and N-butyl-chloroacridone.

Commercially available products, such as IRGACURE 907, IRGACURE 369 and IRGACURE 379 (trade name, all manufactured by BASF Japan Ltd.) are also applicable as aminoacetophenone initiators.

As the acylphosphine compounds, for example, acylphosphine oxide initiators described in Japanese Patent No. 4225898 and commercially available products such as IRGACURE 819 and DAROCUR TPO (trade name: all manufactured by BASF Japan Ltd.) are applicable.

Examples of the hydroxyacetophenone compounds include 2-hydroxy-2-methyl-1-phenylpropan-1-one (DAROCUR 1173), 2-hydroxy-2-methyl-1-phenylbutan-1-one, 1-(4-methylphenyl)-2-hydroxy-2-methylpropan-1-one, 1-(4-isopropylphenyl)-2-methylpropan-1-one, 1-(4-butylphenyl)-2-hydroxy-2-methylpropan-1-one, 2-hydroxy-2-methyl-1-(4-octylphenyl)propan-1-one, 1-(4-dodecylphenyl)-2-methylpropan-1-one, 1-(4-methoxyphenyl)-2-methylpropan-1-one, 1-(4-methylthiophenyl)-2-methylpropan-1-one, 1-(4-chlorophenyl)-2-hydroxy-2-methylpropan-1-one, 1-(4-bromophenyl)-2-hydroxy-2-methylpropan-1-one, 2-hydroxy-1-(4-hydroxyphenyl)-2-methylpropan-1-one, 1-(4-dimethylaminophenyl)-2-hydroxy-2-methylpropan-1-one, 1-(4-carboethoxyphenyl)-2-hydroxy-2-methylpropan-1-one, 1-hydroxycyclohexylphenylketone (trade name: IRGACURE 184), and 1-[4-(2-hydroxyethoxy)-phenyl]-2-hydroxy-2-methyl-1-propan-1-one (trade name: IRGACURE 2959).

Moreover, as commercially-available α-hydroxyacetophenone compounds, polymerization initiators available under the trade names of IRGACURE 184, DAROCUR 1173, IRGACURE 127, IRGACURE 2959, IRGACURE 1800, IRGACURE 1870, and DAROCUR 4265 (manufactured by BASF Japan Ltd.) are also applicable.

The photopolymerization initiators other than the oxime ester photopolymerization initiator may be used in an amount in the range of 10% by mass to 500% by mass when the content of the oxime ester photopolymerization initiator in the polymerizable composition of the invention is defined as 100% by mass.

<(B) Organic Acid Anhydride Having a Molecular Weight of 300 or Lower>

The polymerizable composition of the invention includes an organic acid anhydride having a molecular weight of 300 or lower.

Examples of the organic acid anhydride having a molecular weight of 300 or lower include the compounds having a molecular weight of 80 or more and selected from aliphatic carboxylic acid anhydrides, aromatic carboxylic acid anhydrides, and sulfocarboxylic acid anhydrides.

The organic acid anhydride may have either a symmetrical or asymmetrical structure.

Specific examples of the organic acid anhydride include aliphatic carboxylic acid anhydrides, such as acetic acid anhydride, propionic acid anhydride, isobutyric acid anhydride, butyric acid anhydride, 2-methylbutyric acid anhydride, pivalic acid anhydride, isovaleric acid anhydride, valeric acid anhydride, 2-methylvaleric acid anhydride, 3-methylvaleric acid anhydride, 4-methylvaleric acid anhydride, hexanoic acid anhydride, 2-methylhexanoic acid anhydride, 3-methylhexanoic acid anhydride, 4-methylhexanoic acid anhydride, 5-methylhexanoic acid anhydride, heptanoic acid anhydride, 2-methylheptanoic acid anhydride, 3-methylheptanoic acid anhydride, 4-methyl heptanoic acid anhydride, 5-methylheptanoic acid anhydride, 6-methylheptanoic acid anhydride, 3-phenylpropionic acid anhydride, phenylacetic acid anhydride, methacrylic acid anhydride, acrylic acid anhydride, trichloroacetic acid anhydride, trifluoroacetic acid anhydride, tetrahydrophthalic acid anhydride, succinic acid anhydride, maleic acid anhydride, itaconic acid anhydride, and glutaric acid anhydride.

Examples of the aromatic carboxylic acid anhydrides include benzoic acid anhydride, phthalic acid anhydride, trimellitic acid anhydride, pyromellitic acid anhydride, and naphthalic acid anhydride.

Examples of the sulfocarboxylic acid anhydrides include 2-sulfobenzoic acid anhydride.

The boiling point of the organic acid anhydride having a molecular weight of 300 or lower is preferably from 100° C. to 200° C. In the present specification, the boiling point refers to a value measured at 760 mmHg.

It is considered that by using an organic acid anhydride having a boiling point of 200° C. or less, the organic acid anhydride volatilizes during coating the polymerizable composition and drying the same by heat. As a result, negative effects to a pattern shape of the obtained cured film after being exposed and developed may be suppressed, and generation of development residues may be suppressed.

Examples of the most preferable organic acid anhydride from this viewpoint include an acetic acid anhydride, a propionic acid anhydride, and an isobutyric acid anhydride.

Moreover, the organic acid anhydride having a molecular weight of 300 or lower is preferably represented by the following Formula (5).

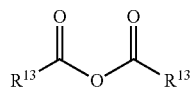

(5)

$R^{13}$ in Formula (5) represents an alkyl group having carbon atoms of 8 or lower or an aryl group having carbon atoms of 8 or lower, and represents the same substituent as that of $R^6$ in Formula (2), $R^{10}$ in Formula (3) or $R^{12}$ in Formula (4).

$R^{13}$ is preferably a methyl group, an ethyl group, an isopropyl group or a phenyl group, and most preferably a methyl group.

The mass ratio of the oxime ester photopolymerization initiator with respect to the organic acid anhydride (oxime ester photopolymerization initiator:organic acid anhydride) is 100:1 to 1:5, preferably 20:1 to 1:1, and more preferably 20:1 to 4:1. When the amount of the acid anhydride is smaller than the above, the effect of suppressing a reduction in sensitivity with time may not be sufficient. When the amount of the acid anhydrides is larger than the above, a favorable pattern shape may not be obtained.

The content of the acid anhydrides is preferably in the range of 0.2% by mass to 1.2% by mass, when the solid content in the polymerizable composition of the invention is defined as 100% by mass. When the content of the acid anhydride is within this range, negative effects to a pattern shape or contamination of a device due to volatilization of the acid anhydride during baking may be suppressed.

<(C) Polymerizable Compound>

The polymerizable composition according to the invention includes a polymerizable compound. Since the oxime ester photopolymerization initiator has an ability of initiating polymerization, the polymerizable composition can form a cured film by polymerization and curing of the polymerizable composition caused by a function of the oxime ester photopolymerization initiator.

The polymerizable compound that may be used in the polymerizable composition according to the invention is an addition polymerizable compound having at least one ethylenically unsaturated double bond, and is selected from compounds having at least one, preferably two or more, terminal ethylenically unsaturated bonds. Such compounds are widely known in the industrial field and can be used in the invention without particular limitation. These compounds have a chemical form of a monomer, a prepolymer, i.e., a dimer, a trimer and an oligomer, or a mixture and a copolymer thereof, for example.

Examples of the polymerizable compound suitably used in the invention will be explained in detail.

Examples of the monomers and copolymers thereof include unsaturated carboxylic acids (such as acrylic acid, methacrylic acid, itaconic acid, crotonic acid, isocrotonic acid or maleic acid) and an ester or an amide of these unsaturated carboxylic acids. Preferred examples include an ester of unsaturated carboxylic acid and an aliphatic polyhydric alcohol compound, and an amide of unsaturated carboxylic acid and an aliphatic polyhydric alcohol compound. It is also suitable to use compounds obtained by addition reaction of unsaturated carboxylic acid eater or amide having a nucleophilic substituent, such as a hydroxyl group, an amino group or a mercapto group, with a monofunctional or polyfunctional isocyanate or epoxy; and compounds obtained by dehydration condensation reaction of an unsaturated carboxylic ester or amide with a monofunctional or polyfunctional carboxylic acid.

Also preferred are compounds obtained by addition reaction of an unsaturated carboxylic ester or amide having an electrophilic substituent, such as an isocyanate group or an epoxy group, with a monofunctional or polyfunctional alcohol, amine or thiol; and compounds obtained by substitution reaction of an unsaturated carboxylic ester or amide having an leaving substituent, such as a halogen group or a tosyloxy group, with a monofunctional or polyfunctional alcohol, amine or thiol.

It is also possible to use compounds obtained through the above reactions but the unsaturated carboxylic acid is changed to an unsaturated phosphonic acid, styrene, vinyl ether, or the like.

Specific examples of a monomer as an ester of an aliphatic polyhydric alcohol and an unsaturated carboxylic acid include acrylic acid esters, such as ethylene glycol diacrylate, triethylene glycol diacrylate, 1,3-butane diol diacrylate, tetramethylene glycol diacrylate, propylene glycol diacrylate, neopentyl glycol diacrylate, trimethylol propane triacrylate, trimethylol propane tri(acryloyloxypropyl)ether, trimethylol ethane triacrylate, hexane diol diacrylate, 1,4-cyclohexane diol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomers, and isocyanuric acid EO-modified triacrylate.

Examples of methacrylic acid esters include tetramethylene glycol dimethacrylate, triethylene glycol dimethacrylate, neopentyl glycol dimethacrylate, trimethylol propane trimethacrylate, trimethylol ethane trimethacrylate, ethylene glycol dimethacrylate, 1,3-butane diol dimethacrylate, hexane diol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2 hydroxypropoxy) phenyl]dimethyl methane, and bis-[p-(methacryloxyethoxy) phenyl]dimethyl methane.

Examples of itaconic acid esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of crotonic acid esters include ethylene glycol dicrotonate, tetramethylene glycol dicrotonate, pentaerythritol dicrotonate, and sorbitol tetradicrotonate.

Examples of isocrotonic acid esters include ethylene glycol diisocrotonate, pentaerythritol diisocrotonate, and sorbitol tetraisocrotonate.

Examples of maleic acid esters include ethylene glycol dimaleate, triethylene glycol dimaleate, pentaerythritol dimaleate, and sorbitol tetramaleate.

Preferable examples of other esters include aliphatic alcohol-based esters described in JP-B No. 51-47334 and JP-A No. 57-196231, esters each having an aromatic skeleton described in JP-A Nos. 59-5240, 59-5241 and 2-226149, and esters each having an amino group described in JP-A No. 1-165613. These ester monomers described above can be used also as a mixture.

Specific examples of a monomer of amide of an aliphatic polyvalent amine compound and an unsaturated carboxylic acid include methylene bis-acrylamide, methylene bis-methacrylamide, 1,6-hexamethylene bis-acrylamide, 1,6-hexamethylene bis-methacrylamide, diethylenetriamine tris-acrylamide, xylylene bis-acrylamide, and xylylene bis-methacrylamide.

Preferable examples of other amide-type monomers include those having a cyclohexylene structure described in JP-B No. 54-21726.

Among these compounds, polyfunctional polymerizable compounds including those used in the later-described Examples, such as dipentaerythritol hexaacrylate and pentaerythritol triacrylate, are preferred.

A urethane addition-polymerizable compound obtained via addition reaction of an isocyanate and a hydroxyl group is also preferable. Specific examples thereof include a vinyl urethane compound having two or more polymerizable vinyl groups per molecule described in JP-B No. 48-41708, which is obtained by adding a vinyl monomer having a hydroxyl group, represented by Formula (1) as described below, to a polyisocyanate compound having two or more isocyanate groups per molecule.

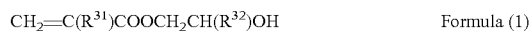

$$CH_2=C(R^{31})COOCH_2CH(R^{32})OH \quad \text{Formula (1)}$$

(in Formula (1), $R^{31}$ and $R^{32}$ each independently represent H or $CH_3$.)

It is also possible to use compounds represented by Formula (1) and Formula (2) described in JP-A No. 10-62986 as the polymerizable compound. These compounds are obtained by adding ethylene oxide or propylene oxide to a polylfunctional alcohol and then (meth)acrylating the same.

Among these, the polymerizable compound is preferably pentaerythritol tri(meth)acrylate, pentaerythritol tetra(meth)acrylate, hexanediol di(meth)acrylate, dipentaerythritol penta(meth)acrylate, dipentaerhythritol hexa(meth)acrylate, and these compounds having a structure in which the (meth)acryloyl group is bonded via a residual group of ethylene glycol or propylene glycol. Oligomers of these compounds are also applicable.

The polymerizable compound that may be used in the invention is preferably a tetra or higher-valent acrylate compound.

Other suitable examples of the polymerizable compound include urethane acrylates such as those described in JP-B No. 48-71708, JP-A No. 51-37193, JP-B No. 2-32293 and JP-B No. 2-16765; and urethane compounds having an ethylene oxide structure such as those described in JP-B No. 58-49860, JP-B No. 56-17654, JP-B No. 62-39417 and JP-B No. 62-39418.

Further, a curable composition that exhibits an excellent photosensitizing speed can be obtained by using an addition-polymerizable compound having an amino structure or a sulfide structure in the molecule, such as those described in JP-A No. 63-277653, JP-A No. 63-260909 and JP-A No. 1-105238.

Examples of the commercially available products of the polymerizable compound include urethane oligomers UAS-10 and UAB-140 (trade name, manufactured by Nippon Paper Industries Co., Ltd.), UA-7200 (trade name, manufactured by Shin-Nakamura Chemical Co., Ltd.), DPHA-40H (trade name, manufactured by Nippon Kayaku Co., Ltd.), UA-306H, UA-306T, UA-306I, AH-600, T-600 and AI-600 (trade name, manufactured by Kyoeisha Chemical Co., Ltd.)

It is also suitable to use an ethylenically unsaturated compound having an acidic group as the polymerizable compound.

The ethylenically unsaturated compound having an acidic group can be obtained by (meth)acrylating part of hydroxyl groups of a polyfunctional alcohol and allowing the remaining hydroxyl groups to addition reaction with an acid anhydride to convert to carboxyl groups, or by other methods. Commercially available products include a trifunctional acrylate having a carboxyl group such as TO-756 (trade name, manufactured by Toagosei Co., Ltd.) and a pentaacrylate having a carboxyl group such as TO-1382 (trade name, manufactured by Toagosei Co., Ltd.)

Details of the addition-polymerizable compound, such as the structure, whether or not the compound should be used alone or in combination of two or more kinds, or the amount of the compound to be added, can be arbitrarily determined in accordance with the desired performances of the finally obtained addition-polymerizable compound. For example, the addition-polymerizable compound can be selected from the following viewpoints.

In view of the sensitivity, the addition-polymerizable compound containing more unsaturated groups per molecule is more preferred, and addition-polymerizable compounds having two or more functional groups are typically preferred. In order to increase the strength of a cured film, the addition-polymerizable compound preferably has three or more functional groups. It is also effective to control both the sensitivity and the strength by using a compound having a different number of functional groups or a different type of polymerizable groups (e.g. acrylates, methacrylates, styrene compounds, and vinyl ether compounds) in combination with the addition-polymerizable compound.

Selection of the addition polymerizable compound and the method of using the same are important factors also with respect to dispersibility and compatibility with other components (e.g. a photopolymerization initiator, a colorant (pigment or dye), and a binder polymer) to be contained in the addition polymerizable composition. The compatibility of the addition polymerizable compound may be improved by using, for example, an addition-polymerizable compound with low purity or a combination of two or more addition-polymerizable compounds, or alternatively, selecting a particular structure. It is also possible to select an addition-polymerizable compound having a particular structure for the purpose of improving its adhesion with respect to a hard surface of a support or the like.

The polymerizable compound may be used alone or in a combination of two or more kinds thereof.

The content of the polymerizable compound in the polymerizable composition is preferably from 0.1 to 30% by mass, more preferably from 0.2 to 20% by mass, and still more preferably from 0.3 to 15% by mass, with respect to the total solid content of the composition.

<(D) Colorant>

The polymerizable composition according to the invention may contain a colorant. By including a colorant, a colored polymerizable composition having a desired color can be obtained. Accordingly, a colorant may be arbitrarily selected and used according to purposes of the polymerizable composition.

Since the polymerizable composition according to the invention includes a photopolymerization initiator that exhibits excellent sensitivity with respect to a light source having a short wavelength, i.e., 365 nm, the polymerizable composition can be cured with high sensitivity even when a colorant is contained therein at high concentration.

The colorant that may be used in the polymerizable composition is not particularly limited, and various known dyes or pigments can be used alone or as a mixture of two or more kinds thereof. The colorant are suitably selected according to the intended use of the polymerizable composition. When the polymerizable composition of the invention is used for manufacturing a color filter, either a colorant having a chromatic color such as R, G or B, which is used for forming color pixels of a color filter (chromatic color colorant), or a colorant having a black color, which is generally used for forming a black matrix (black colorant), can be used.

Since the polymerizable composition of the invention includes the oxime ester photopolymerization initiator and cures at high sensitivity even with a small exposure amount, it is particularly preferably used as a polymerizable composition containing a black colorant that is hard to transmit light.

Hereinafter, the colorant applicable to the polymerizable composition will be described in detail, by referring to the colorants suitable for color filters of solid-state image sensors.

—(D-1) Pigment—

Examples of chromatic color pigments include various kinds of known inorganic or organic pigments. Considering that it is preferable that the polymerizable composition has a high transmittance with respect to exposure light whether or not the pigment is inorganic or organic, the particle diameter of the pigment is preferably as small as possible, and in view of handleability, the average particle diameter of the pigment is preferably from 0.01 µm to 0.1 µm, and more preferably from 0.01 µm to 0.05 µm.

Examples of the inorganic pigments include metallic compounds such as metal oxides, metal complex salts and the like, and specific examples include oxides of metals, such as iron, cobalt, aluminum, cadmium, lead, copper, titanium, magnesium, chromium, zinc and antimony, and complex oxides of these metals.

Examples of the organic pigments include those described in paragraphs [0030] to and paragraphs [0039] to [0048] of JP-A No. 2008-224982; and organic pigments formed by changing Cl to OH in the structure of C. I. Pigment Green 58 and C.I. Pigment Blue 79.

In particular, in the invention, pigments having a basic nitrogen atom in the structure thereof are preferably used. These pigments having a basic nitrogen atom demonstrate favorable dispersibility in a polymerizable composition. The reason for this has not been sufficiently elucidated, but is presumed to be due to favorable affinity achieved between a photosensitive polymerization component and the pigment.

These organic pigments can be used alone or as a combination in various ways, in order to increase the color purity.

Specific examples of the type and the combination of the pigments include the use of a red pigment such as an anthraquinone pigment, a perylene pigment or a diketopyrrolopyrrole pigment, and combinations of at least one of these red pigments with a yellow pigment such as a disazo yellow pigment, an isoindoline yellow pigment or a quinophthalone yellow pigment, or with a perylene red pigment.

Examples of the anthraquinone pigment include C.I. Pigment Red 177. Examples of the perylene pigment include C.I. Pigment Red 155 and C.I. Pigment Red 224. Examples of the diketopyrrolopyrrole pigment include C.I. Pigment Red 254. From the viewpoint of color reproducibility, these red pigments are preferably used in combination with C.I. Pigment Yellow 139.

The mass ratio of the red pigment to the yellow pigment (red pigment:yellow pigment) is preferably from 100:5 to 100:50. When the mass ratio is within this range, it is advantageous in terms of improving the color purity and adjusting the color hue to conform to the target spectrum of photodiodes or the like.

The mass ratio is particularly preferably within the range of from 100:10 to 100:30. When two or more kinds of red pigments are used in combination, the mass ratio of the pigments can be adjusted in accordance with the chromaticity thereof.

As a green pigment, a halogenated phthalocyanine pigment can be used alone or in combination with a disazo yellow pigment, a quinophthalone yellow pigment, an azomethine yellow pigment, or an isoindoline yellow pigment.

Preferable examples of such combinations include a combination of C.I. Pigment Green 7, 36 or 37 with C.I. Pigment Yellow 83, C.I. Pigment Yellow 138, C.I. Pigment Yellow 139, C.I. Pigment Yellow 150, C.I. Pigment Yellow 180 or C.I. Pigment Yellow 185. The mass ratio of the green pigment to the yellow pigment (green pigment:yellow pigment) is preferably from 100:5 to 100:150. When the mass ratio is within this range, it is advantageous in terms of improving the color purity and adjusting the color hue to conform to the target spectrum of photodiodes or the like.

The mass ratio is particularly preferably in the range of from 100:30 to 100:120.

As a green pigment, a halogenated phthalocyanine pigment containing zinc is preferably used. Examples of such a pigment include C.I. Pigment Green 58.

As a blue pigment, a phthalocyanine pigment can be used alone or in combination with a dioxazine purple pigment.

Preferable examples of the blue pigment include a mixture of C.I. Pigment Blue 15:6 with C.I. Pigment Violet 23. The mass ratio of the blue pigment to the purple pigment (blue pigment:purple pigment) is preferably from 100:0 to 100:120, more preferably from 100:0 to 100:60.

Among these pigments, a pigment containing zinc is particularly preferred, since the pigment improves the transmittance in a desired absorption band, and enables spectrum design that achieves excellent color separation.

—(D-2) Light Blocking Pigment—

Examples of light blocking pigments, which are suitably used when the polymerizable composition of the invention is used for the formation of a black matrix or a light blocking film of wafer level lens, include carbon black, titanium black, iron oxide, and titanium oxide. These pigments may be used alone or as a mixture of two or more kinds. Among these pigments, titanium black is particularly preferred as a light blocking pigment.

In the following, titanium black, which is a suitable pigment as a light blocking pigment, and a titanium black dispersion, which is a suitable form of using titanium black, will be explained.

The titanium black dispersion refers to a dispersion containing titanium black as a colorant.

When titanium black is used in the polymerizable composition in the form of a previously prepared titanium black dispersion, dispersibility and dispersion stability of the titanium black can be improved.

Hereinafter, titanium black will be described.

The titanium black usable in the invention refers to black particles including a titanium atom. Preferable examples thereof include lower titanium oxide and titanium oxynitride. Titanium black particles can be surface-modified for the purpose of improving dispersibility, suppressing aggregation properties, or the like, as necessary. Titanium black particles can be coated with silicon oxide, titanium oxide, germanium oxide, aluminum oxide, magnesium oxide, or zirconium oxide; or can be treated with a water-repellent substance, such as those described in JP-A No. 2007-302836.

Examples of the method for producing titanium black include a method including heating and reducing a mixture of titanium dioxide and metal titanium under a reductive atmosphere (see JP-A No. 49-5432); a method including reducing ultrafine titanium dioxide obtained by subjecting tetrachloride titanium to high-temperature hydrolysis under a reductive atmosphere containing hydrogen (see JP-A No. 57-205322); a method including reducing titanium dioxide or titanium hydroxide at high temperature in the presence of ammonia (see JP-A Nos. 60-65069 and 61-201610); and a method including attaching a vanadium compound to titanium dioxide or titanium hydroxide, and reducing the same at high temperature in the presence of ammonia (see JP-A No. 61-201610). However, the method for producing titanium black is not limited to the above.

The particle diameter of titanium black particles is not particularly limited, but is preferably from 3 to 2000 nm, more preferably from 10 to 500 nm, and still more preferably from 20 to 200 nm, from the viewpoint of dispersibility and colorability.

The specific surface area of titanium black is not particularly limited, but the value measured by a BET method is usually from about 5 to 150 $m^2/g$, and particularly preferably from about 20 to 100 $m^2/g$, in order to achieve desired water repellency of the titanium black after being surface-treated with a water-repellent agent.

Examples of commercially available products of titanium black include TITANIUM BLACK 10S, 12S, 13R, 13M, 13M-C, 13R and 13R-N (trade name, manufactured by MITSUBISHI MATERIALS CORP.) and TILACK D (trade name, manufactured by Ako Kasei Co., Ltd.), but the invention is not limited to these products.

—(D-3) Dye—

When the colorant used in the polymerizable composition is a dye, a colored composition in which the colorant is uniformly dissolved can be obtained.

The dye that can be used as the colorant in the polymerizable composition is not particularly limited, and known dyes used for color filters can be used.

In terms of chemical structure, exemplary dyes that can be used include pyrazole azo dyes, anilino azo dyes, triphenylmethane dyes, anthraquinone dyes, anthrapyridone dyes, benzylidene dyes, oxonol dyes, pyrazolotriazole azo dyes, pyridone azo dyes, cyanine dyes, phenothiazine dyes, pyrrolopyrazole azo methine dyes, xanthene dyes, phthalocyanine dyes, benzopyran dyes, indigo dyes and pyrromethene dyes.

In particular, pyrromethene dyes, such as those described in paragraphs [0093] to paragraph [0130] of JP-A No. 2008-292970, are suitably used in the invention.

The content of the colorant in the polymerizable composition is preferably from 30% by mass to 95% by mass, more preferably from 40% by mass to 90% by mass, and still more preferably from 50% by mass to 80% by mass, with respect to the total solid content of the polymerizable composition.

By adjusting the content of the colorant to be within the above range, an appropriate chromaticity can be obtained when a color filter is produced using the polymerizable composition. Moreover, the polymerization composition can be sufficiently cured by light and strength of a film can be maintained. As a result, narrowing of the development latitude during alkali development can be suppressed.

<(E) Dispersant>

When the polymerizable composition contains, as a (D) colorant, a (D-2) light blocking pigment such as titanium black or a (D-1) pigment such as an organic pigment (hereinafter, the light-blocking pigments such as titanium black and the organic or inorganic pigments are also collectively referred to as "pigment"), it is preferable to further add a pigment dispersant from the viewpoint of increasing the dispersibility of the pigment.

Examples of the pigment dispersant that can be used in the invention include polymer dispersants (e.g., polyamide amine and a salt thereof, polycarboxylic acid and a salt thereof, high-molecular-weight unsaturated acid ester, modified polyurethane, modified polyester, modified poly(meth)acrylate, a (meth)acrylic copolymer, and a naphthalene sulfonic acid formalin condensate), polyoxyethylene alkyl phosphoric acid ester, polyoxyethylene alkylamine, alkanolamine, and a pigment derivative.

The polymer dispersants can be further classified into a straight-chain polymer, a terminal-modified polymer, a graft polymer, and a block polymer, from the viewpoint of its structure.

A polymer dispersant functions to prevent re-aggregation of a pigment by adsorbing to a surface of the pigment. Therefore, a polymer dispersant having an anchor site with respect to the pigment surface, selected from a terminal-modified polymer, a graft polymer and a block polymer, can be mentioned as preferable structures of the polymer dispersant.

On the other hand, a pigment derivative exhibits an effect of promoting adsorption of a polymer dispersant by modifying a surface of the pigment.

The pigment dispersant that can be used in the invention is available also as commercial products, and specific examples thereof include DISPERBYK-101 (polyamidoamine phosphoric acid salt), 107 (carboxylic acid ester), 110 (copolymer containing an acid group), 130 (polyamide), 161, 162, 163, 164, 165, 166 and 170 (high-molecular-weight copolymers) and BYK-P104 and P105 (high-molecular-weight unsaturated polycarboxylic acid) manufactured by BYK Chemie Corp.; EFKA 4047, 4050 to 4010 to 4165 (polyurethanes), EFKA 4330 to 4340 (block copolymers), 4400 to 4402 (modified polyacrylate), 5010 (polyester amide), 5765 (high-molecular-weight polycarboxylic acid salt), 6220 (fatty acid polyester), 6745 (phthalocyanine derivative) and 6750 (azo pigment derivative), manufactured by EFKA Additives, Inc.; AJISPER-PB821 and PB822 manufactured by Ajinomoto Fine Techno Co., Inc.; FLOWLEN TG-710 (urethane oligomer), and POLYFLOW No. 50E and No. 300 (acrylic copolymers) manufactured by Kyoeisha Chemical Co., Ltd.; DISPERON KS-860, 873SN, 874, #2150 (aliphatic polyvalent carboxylic acids), #7004 (polyether ester), DA-703-50, DA-705, and DA-725 manufactured by Kusumoto Chemicals, Ltd.; DEMOL RN, N (naphthalenesulfonic acid-formalin polycondensate), MS, C and SN-B (aromatic sulfonic acid-formalin polycondensate), HOMOGENOL L-18 (high-molecular-weight polycarboxylic acid), EMARGEN 920, 930, 935 and 985 (polyoxyethylene nonylphenyl ether), and ACETAMINE 86 (stearylamine acetate) manufactured by Kao Corp.; SOLSPERSE 5000 (phthalocyanine derivative), 22000 (azo pigment derivative), 13240 (polyesteramine), 3000, 17000 and 27000 (polymer having a functional moiety at the end), 24000, 28000, 32000 and 38500 (graft type polymers) manufactured by Lubrizol Corp.; and NIKKOL T 106 (polyoxyethylene sorbitan monooleate) and MYS-IEX (polyoxyethylene monostearate) manufactured by Nikko Chemical Co., Ltd.

Amphoteric dispersants, such as HINOACT T-8000E (trade name, manufactured by Kawaken Fine Chemicals Co., Ltd.) are also applicable in the invention.

These pigment dispersants may be used alone or in combination of two or more kinds thereof. In the invention, it is preferable to use, in particular, a pigment derivative and a polymer dispersant in combination.

The content of the dispersant in the polymerizable composition is preferably 1 to 80 parts by mass, more preferably 5 to 70 parts by mass, and still more preferably 10 to 60 parts by mass, with respect to 100 parts by mass of the pigment used as the colorant.

Specifically, when a polymer dispersant is used, the amount thereof is preferably in the range of from 5 to 100 parts by mass, and more preferably in the range of from 10 to 80 parts by mass, with respect to 100 parts by mass of the pigment.

When a pigment derivative is used in combination, the amount of the pigment derivative is preferably in the range of from 1 to 30 parts by mass, more preferably in the range of from 3 to 20 parts by mass, and particularly preferably in the range of from 5 to 15 parts by mass, with respect to 100 parts by mass of the pigment.

When a pigment is used as the colorant together with a pigment dispersant in the polymerizable composition, the total content of the colorant and the dispersant is preferably from 30 to 90% by mass, more preferably from 40 to 85% by mass, and still more preferably from 50 to 80% by mass, with respect to the total solid content in the polymerizable composition, from the viewpoint of curing sensitivity and color density.

<Other Ingredients>

The polymerizable composition may further contain other ingredients as described below as required, insofar as the effects of the invention are not impaired.

Hereinafter, the other ingredients that may be included in the polymerizable composition will be described.

<(F) Sensitizer>

The polymerizable composition may contain a sensitizer for the purpose of enhancing the radical generation efficiency of a radical initiator and extending the wavelength of light to which the polymerizable composition is sensitive.

The sensitizer that can be used in the invention is preferably one capable of sensitizing the oxime ester photopolymerization initiator as described above by way of an electron transfer mechanism or an energy transfer mechanism.

Examples of the sensitizers for use in the polymerizable composition include compounds described in paragraphs [0101] to [0154] of JP-A No. 2008-32803.

The content of the sensitizer in the polymerizable composition is preferably from 0.1% by mass to 20% by mass, and more preferably from 0.5% by mass to 15% by mass in terms of solid content, from the viewpoint of optical absorption efficiency and initiation decomposition efficiency at deep portions.

The sensitizers may be used alone or in combination of two or more kinds thereof.

<(G) Binder>

The polymerizable composition may further include a binder for the purpose of improving the coating properties or the like, as required. As the binder, it is preferable to use a linear organic polymer.

Any known linear organic polymer may be used as appropriate. Preferably, a linear organic polymer that is soluble or swellable with respect to water or weak alkaline water is selected in order to enable development with water or development with weak alkaline water. The linear organic polymer is selected and used not only in view of using the same as a film-forming agent, but also in view of its applicability to a water developer, a weak alkaline water developer or an organic solvent developer. For example, when a water-soluble organic polymer is used, development with water can be performed.

Examples of such a linear organic polymer include compounds described in paragraphs [0166] to [0175] of JP-A No. 2008-32803, and the compounds can be applied to the invention.

Further examples of the binder polymer include acidic cellulose derivatives having a carboxylic acid group in the side chain, and compounds prepared by adding a cyclic acid anhydride to a polymer having a hydroxyl group or the like are also useful.

Yet further preferable examples of the binder in the invention include a polymer including a structure derived from a compound represented by the following Formula (ED) (hereinafter, also referred to as an "ether dimer") as a polymerization component.

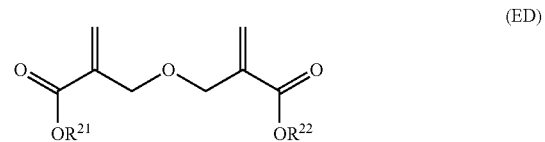

(ED)

In the Formula (ED), each of $R^{21}$ and $R^{22}$ independently represents a hydrogen atom or a hydrocarbon group having 1 to 25 carbon atoms that may have a substituent.

By using a binder including a structural unit derived from an ether dimer, the polymerizable composition according to the invention may exhibit an advantage of forming a cured film that exhibits extremely superior heat resistance and transparency.

In the Formula (ED), the hydrocarbon group having 1 to 25 carbon atoms that may have a substituent represented by $R^{21}$ and $R^{22}$ is not particularly limited, but examples thereof include an alkyl group having a linear or branched structure such as a methyl group, an ethyl group, an n-propyl group, an isopropyl group, an n-butyl group, an isobutyl group, a t-butyl group, a t-amyl group, a stearyl group, a lauryl group, and a 2-ethylhexyl group; an aryl group such as a phenyl group: an alicyclic group such as a cyclohexyl group, a t-butylcyclohexyl group, a dicyclopentadienyl group, a tricyclodecanyl group, an isobornyl group, an adamanthyl group, and a 2-methyl-2-adamanthyl group; an alkoxy-substituted alkyl group such as 1-methoxyethyl group and a 1-ethoxyethyl group; and an aryl-substituted alkyl group such as a benzyl group. Among these, a methyl group, an ethyl group, a cyclohexyl group and a benzyl group, which are a substituent of primary or secondary carbon and are hard to leave due to acid or heat, are preferred in view of heat resistance.

Specific examples of the ether dimer include
dimethyl-2,2'-[oxybis(methylene)]bis-2-propenoate,
diethyl-2,2'-[oxybis(methylene)]bis-2-propenoate,
di(n-propyl)-2,2'-[oxybis(methylene)]bis-2-propenoate,
di(isopropyl)-2,2-[oxybis(methylene)]bis-2-propenoate,
di(n-butyl)-2,2-[oxybis(methylene)]bis-2-propenoate,
di(isobutyl)-2,2'-[oxybis(methylene)]bis-2-propenoate,
di(t-butyl)-2,2'-[oxybis(methylene)]bis-2-propenoate,
di(t-amyl)-2,2'-[oxybis(methylene)]bis-2-propenoate,
di(stearyl)-2,2'-[oxybis(methylene)]bis-2-propenoate,
di(lauryl)-2,2'-[oxybis(methylene)]bis-2-propenoate,
di(2-ethylhexyl)-2,2'-[oxybis(methylene)]bis-2-propenoate,
di(1-methoxyethyl)-2,2'-[oxybis(methylene)]bis-2-propenoate, di(1-ethoxyethyl)-2,2-[oxybis(methylene)]bis-2-propenoate,
dibenzyl-2,2'-[oxybis(methylene)]bis-2-propenoate,
diphenyl-2,2-[oxybis(methylene)]bis-2-propenoate,
dicyclohexyl-2,2'-[oxybis(methylene)]bis-2-propenoate,
di(t-butylcyclohexyl)-2,2'-[oxybis(methylene)]bis-2-propenoate,
di(dicyclopentadienyl)-2,2'-[oxybis(methylene)]bis-2-propenoate,
di(tricyclodecanyl)-2,2'-[oxybis(methylene)]bis-2-propenoate,
di(isobornyl)-2,2'-[oxybis(methylene)]bis-2-propenoate,
diadamanthyl-2,2-[oxybis(methylene)]bis-2-propenoate, and
di(2-methyl-2-adamanthyl)-2,2-[oxybis(methylene)]bis-2-propenoate.

Among these, dimethyl-2,2'-[oxybis(methylene)]bis-2-propenoate, diethyl-2,2'-[oxybis(methylene)]bis-2-propenoate, dicylohexyl-2,2'-[oxybis(methylene)]bis-2-propenoate, and dibenzyl-2,2'-[oxybis(methylene)]bis-2-propenoate are particularly preferred. These structural units derived from a compound derived from the ether dimer may be included in the binder alone or as a combination of two or more kinds.

The binder formed by including a monomer derived from a compound represented by (ED) may be a copolymer formed by including a compound having a different structure than that derived from the compound represented by Formula (ED). Examples of the monomer having a different structure include the monomers previously mentioned as the examples of the structural unit of the binder, and such monomers may be used as appropriate within a range in which the properties of the ether dimer are not affected.

The weight average molecular weight of the binder usable in the polymerizable composition is preferably in range of 5,000 or larger, and more preferably from 10,000 to 300,000. The number average molecular weight of the binder is preferably 1,000 or larger and more preferably in the range of from 2,000 to 250,000. The polydispersity (weight average molecular weight/number average molecular weight) of the binder is preferably 1 or more, and more preferably in the range of from 1.1 to 10.

From the viewpoint of pattern formation properties, the binder preferably has an acid value of from 50 mgKOH/g to 150 mgKOH/g.

Such binders may be any of a random polymer, a block polymer, a graft polymer, or the like.

The content of the binder polymer is preferably from 1 to 50% by mass, more preferably from 1 to 30% by mass, and still more preferably from 1 to 20% by mass, with respect to the total solid content of the polymerizable composition.

<(H) Polymerization Inhibitor>

In order to prevent unnecessary thermal polymerization of the polymerizable compound, which occurs while producing or storing the polymerizable composition, a small amount of thermal polymerization inhibitor is preferably added to the polymerizable composition.

Examples of the thermal polymerization inhibitor that can be used in the invention include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), and N-nitrosophenylhydroxyamine cerium (I) salt.

The addition amount of the thermal polymerization inhibitor is preferably from about 0.01% by mass to about 5% by mass, with respect to the total solid content of the polymerizable composition.

Further, if necessary, a higher fatty acid derivative, such as behenic acid or behenic acid amide, may be added in such a manner that the higher fatty acid derivative exists locally on the surface of a coating during drying the coating, in order to prevent polymerization inhibition caused by oxygen. The addition amount of the higher fatty acid derivative is preferably from about 0.5% by mass to about 10% by mass, with respect to the total mass of the polymerizable composition.

<(J) Organic Solvent>

The polymerizable composition according to the invention may contain an organic solvent.

The organic solvent is not particularly limited as long as it satisfies solubility of each of the co-existing components, and a coating ability of the polymerizable composition. In particular, the organic solvent is preferably selected in view of solubility of the binder, coating ability and safety. Examples of the organic solvent include the solvents described in paragraph [0187] of JP-A No. 2008-32803.

Examples of the organic solvent include esters, ethers, ketones and aromatic hydrocarbons.

Specific examples of the esters include ethyl acetate, n-butyl acetate, isobutyl acetate, amyl formate, isoamyl acetate, isobutyl acetate, butyl propionate, isopropyl butyrate, ethyl butyrate, butyl butyrate, methyl lactate, ethyl lactate, alkyl oxyacetates (methyl oxyacetate, ethyl oxyacetate, butyl oxyacetate etc.; specifically, methyl methoxyacetate, ethyl methoxyacetate, butyl methoxyacetate, methyl ethoxyacetate, ethyl ethoxyacetate etc.), alkyl 3-oxypropionate (methyl 3-oxy propionate, ethyl 3-oxy propionate (methyl 3-methoxy propionate, ethyl 3-oxy propionate etc.; specifically, methyl 3-methoxy propionate, ethyl 3-methoxy propionate, methyl 3-ethoxy propionate, ethyl 3-ethoxy propionate etc.), alkyl 2-oxypropionates (methyl 2-oxy propionate, ethyl 2-oxy propionate, propyl 2-oxy propionate etc.; specifically, methyl 2-methoxypropionate, ethyl 2-methoxy propionate, propyl 2-methoxypropionate, methyl 2-ethoxypropionate and ethyl 2-ethoxy propionate etc.), methyl 2-oxy-2-methylpropionate, ethyl 2-oxy-2-methylpropionate (specifically, methyl 2-methoxy-2-methylpropionate, ethyl 2-ethoxy-2-methylpropionate etc.), methyl pyruvate, ethyl pyruvate, propyl pyruvate, methyl acetoacetate, ethyl acetoacetate, methyl 2-oxobutanoate and ethyl 2-oxobutanoate.

Specific examples of the ethers include diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol monomethyl ether, propylene glycol monomethyl ether acetate, propylene glycol monoethyl ether acetate, and propylene glycol monopropyl ether acetate.

Specific examples of the ketones include methyl ethyl ketone, cyclohexanone, 2-heptanone and 3-heptanone.

Specific examples of the aromatic hydrocarbons include toluene and xylene.

These organic solvents may be used as a mixture of two or more kinds from the viewpoint of improving solubility of the components, solubility of a binder (if included), coating surface properties, or the like. When two or more kinds of organic solvents are used, a combination including at least two organic-solvents selected from ethyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, ethyl carbitol acetate, butyl carbitol acetate, propylene glycol methyl ether and propylene glycol methyl ether acetate is particularly preferred.

The content of the organic solvent in the polymerizable composition is preferably from 10% by mass to 80% by mass, more preferably from 15% by mass to 60% by mass, with respect to the total solid content of the polymerizable composition.

<(K) Adhesion Improving Agent>

In order to increase the adhesion of the cured film with respect to a hard surface of a support or the like, an adhesion improving agent may be added to the polymerizable composition. Examples of the adhesion improving agent include a silane coupling agent and a titanium coupling agent.

Examples of the silane coupling agent include the compounds described in paragraph [0185] of JP-A No. 2008-32803.

Among these compounds, γ-methacryloxypropyltrimethoxysilane, γ-methacryloxypropyltriethoxysilane, γ-acryloxypropyltrimethoxysilane, γ-acryloxypropyltriethoxysilane, γ-mercaptopropyltrimethoxysilane, γ-aminopropyltriethoxysilane and phenyltrimethoxysilane are preferable, and γ-methacryloxypropyltrimethoxysilane is most preferable.

The amount of the adhesion improving agent is preferably from 0.5% by mass to 30% by mass, and more preferably from 0.7% by mass to 20% by mass, with respect to the total solid content of the polymerizable composition.

<(L) Surfactant>

In order to further improve the coating suitability, various kinds of surfactant may be added to the polymerizable composition of the invention. Examples of the surfactant that may be used in the invention include fluorosurfactants, nonionic surfactants, cationic surfactants, anionic surfactants and silicone surfactants.

In particular, by using a fluorosurfactant, liquid properties of the composition when formulated as a coating liquid (in particular, fluidity) can be further increased, and uniformity in coating thickness and liquid-saving properties can be further improved.

More specifically, in the polymerizable composition containing a fluorosurfactant, the surface tension between the coating liquid and a coated surface is lowered and wettability with respect to the coated surface is improved, whereby the coating properties can be improved. As a result, a film having a uniform thickness with suppressed thickness unevenness can be formed more suitably, even when a thin film having a thickness of several micrometers is formed with a small amount of coating liquid.

The content of fluorine in the fluorosurfactant is preferably from 3% by mass to 40% by mass, more preferably from 5% by mass to 30% by mass, and particularly preferably from 7% by mass to 25% by mass. When the content of fluorine is within this range, it is advantageous in terms of achieving uniform coating thickness and favorable liquid-saving properties, and favorable solubility of the surfactant in the composition.

Specific examples of the fluorosurfactant include MEGAFAC F171, F172, F173, F176, F177, F141, F142, F143, F144, R30, F437, F479, F482, F780 and F781 (trade name, manufactured by DIC Corporation); FLUORAD FC430, FC431 and FC 171 (trade name, manufactured by Sumitomo 3M Co., Ltd.); and SURFLON S-382, SC-101, SC-103, SC-104, SC-105, SC1068, SC-381, SC-383, 5393 and KH-40 (manufactured by Asahi Glass Co., Ltd.)

Specific examples of the nonionic surfactant include polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate and sorbitan fatty acid ester (PLURONIC L10, L31, L61, L62, 10R5, 17R2, 25R2, TETRONIC 304, 701, 704, 901, 904 and 150R1, trade names, manufactured by BASF Japan Ltd.)

Specific examples of the cationic surfactant include a phthalocyanine derivative (commercially-available as EFKA-745, manufactured by Morishita & Co., Ltd.; an organosiloxane polymer (trade name: KP341, manufactured by Shin-Etsu Chemical Co., Ltd.); (meth)acrylic acid-based (co) polymers (trade name: POLYFLOW No. 75, No. 90 and No. 95, manufactured by Kyoeisha Chemical Co., Ltd.; and W001 (trade name, available from Yusho Co., Ltd.)

Specific examples of the anionic surfactant include WO04, WO05 and WO17 (trade name, available from by Yusho Co., Ltd.)

Specific examples of the silicone surfactant include TORAY SILICONE DC3PA, TORAY SILICONE SH7PA, TORAY SILICONE DC11PA, TORAY SILICONE SH21PA, TORAY SILICONE SH29PA, TORAY SILICONE SH30PA and TORAY SILICONE SH8400 (trade names, manufactured by Dow Corning Toray Co., Ltd); TSF-4440, TSF-4300, TSF-4445, TSF-4460 and TSF-4452 (trade names, manufactured by Momentive Performance Materials Inc.); KP341, KF6001 and KF3002 (trade names, manufactured by Shin-Etsu Chemical Co., Ltd.); and BYK323 and BYK330 (trade names, manufactured by BYK Japan K.K.).

The surfactant may be used alone or as a combination of two or more kinds.

<(M) Other Additives>

The polymerizable composition of the invention may include other known additives, such as an inorganic filler or a plasticizer, in order to improve the physical properties of a cured film.

Examples of the plasticizer include dioctyl phthalate, didodecyl phthalate, triethylene glycol diacrylate, dimethylglycol phthalate, tricresyl phosphate, dioctyl adipate, dibutyl sebacate, and triacetyl glycerin. When a binder is used, the plasticizer can be added in an amount of 10% by mass or less with respect to the total mass of a polymerizable compound and a binder polymer.

As described above, since the polymerizable composition contains (A) an oxime ester photopolymerization initiator, (B) an organic acid anhydride having a molecular weight of 300 or less and (C) a polymerizable compound, the polymerizable composition can cure at high sensitivity and reduction in curing sensitivity is not seen after storage over time. Further, the polymerizable composition exhibits excellent storage stability and is capable of reducing the amount of residues after development at unexposed portions.

Since the polymerizable composition can form a pattern at high sensitivity even when a large amount of colorant is contained, the thus-formed colored cured film has advantages such as excellent adhesion with respect to a support and suppressed coloration or color change under repetitive heating or light exposure. In particular, the polymerizable composition is suitable for forming a colored region of color filters, and the effect thereof is particularly significant when used for forming color filters.

In particular, when the polymerizable composition further includes (E) a dispersant or (G) a binder, which may contain a basic component that promotes decomposition of the oxime ester photopolymerization initiator, the effect of the invention, i.e., suppressing reduction in sensitivity over time by adding an organic acid anhydride, is even more remarkable.

Further, since the polymerizable composition according to the invention can cure at high sensitivity and exhibit favorable stability with time, it is also suitably used for other purposes than color filters, such as molding resins, injection-molding resins, photo-molding resins, sealing agents, polymerizable materials for dental use, printing inks, paints, photosensitive resins for printing plate, color proofs for printing, resists for printed board, resists for manufacturing semiconductors, resists for microelectronics, resists for producing units for micro machines, insulating materials, hologram materials, materials for forming a wafer level lens or a light blocking film for the lens, materials for waveguides, overcoat agents, adhesives, pressure-sensitive adhesives, releasable coating agents, and the like.

<Color Filter and Method for Manufacturing the Same>

Next, a color filter of the invention and a method for manufacturing the same will be described.

The color filter of the invention has a colored pattern formed on a support, and the colored pattern is formed by using the polymerizable composition of the invention.

Hereinafter, the color filter of the invention will be described in detail with reference to a method for manufacturing the same (method for manufacturing the color filter of the invention).

The method for manufacturing a color filter of the invention includes a step of forming a colored polymerizable composition layer by applying a polymerizable composition for forming color filters (the polymerizable composition of the invention) onto a support (hereinafter, also referred to as a "polymerizable composition layer formation process"); a step of exposing the polymerizable composition layer to light in a patterned manner (hereinafter, also referred to as an "exposure process"); and a process for forming a colored pattern by developing the polymerizable composition layer after exposing the same to light and removing unexposed portions (hereinafter, also referred to as a "development process").

Specifically, the color filter of the invention can be manufactured by applying the polymerizable composition for color filters of the invention onto a support (substrate) directly or via another layer to form a polymerizable composition layer (a polymerizable composition layer formation process); exposing the same to light through a mask pattern so that only exposed portions are cured (exposure process); and developing the same using a developer (development process), thereby forming a patterned coating film formed from pixels of desired colors (for example, three or four colors).

Hereinafter, processes of the method for manufacturing the color filter of the invention will be described.

<Polymerizable Composition Layer Formation Process>

In the polymerizable composition layer formation process, a layer containing a colored polymerizable composition is formed by applying the polymerizable composition for color filters of the invention onto a support.

Examples of the support usable in the invention include alkali-free glass, soda glass, PYREX (registered trade mark) glass, quartz glass, and products obtained by adhering a transparent conductive film thereto, which are used in liquid crystal display devices or the like, substrates for photoelectric transfer elements for use in solid-image sensors or the like, such as a silicon substrate for CCD imaging devices of CMOS imaging devices. These substrates may have black stripes thereon for isolating pixels from each other.

These supports may also be provided with, as required, an undercoat layer for the purpose of improving the adhesion with respect to an upper layer, preventing diffusion of substance, or flattening the surface of the support.

The application of the polymerizable composition for color filters of the invention onto a support may be carried out by various coating methods, such as slit coating, ink-jetting, spin coating, flow casting, roll coating, screen printing or transfer printing.

The thickness of the polymerizable composition for color filters is preferably from 0.1 μm to 10 μm, more preferably from 0.2 μm to 5 μm, and still more preferably from 0.2 μm to 3 μm.

When manufacturing a color filter for solid-state image sensors, the coating thickness of the polymerizable composition for color filters is preferably from 0.35 μm to 1.5 μm and more preferably from 0.40 μm to 1.0 μm, from the viewpoint of resolution and development properties.

The polymerizable composition for color filters that has been applied onto a support is usually dried under the conditions of from 70° C. to 110° C. and from about 2 minutes to about 4 minutes, whereby a colored polymerizable composition layer is formed.

The polymerizable composition for color filters can be easily removed with a known cleaning liquid even when the polymerizable composition is attached to nozzles at ejection ports of a coating apparatus, piping of the coating apparatus or inside the coating apparatus. In that case, in order to perform the cleaning more efficiently, solvents previously mentioned as the solvents that may be included in the polymerizable composition of the invention is preferably used as a cleaning liquid.

It is also suitable to use the cleaning liquids described in JP-A No. 7-128867, JP-A No. 7-146562, JP-A No. 8-278637, JP-A No. 2000-273370, JP-A No. 2006-85140, JP-A No. 2006-291191, JP-A No. 2007-2101, JP-A No. 2007-2102 and JP-A No. 2007-281523 as the cleaning liquid for removing the polymerizable composition of the invention.

The cleaning liquid is preferably selected from alkylene glycol monoalkyl ether carboxylate or alkylene glycol monoalkyl ether. The solvent used as the cleaning liquid may be used alone or as a combination of two or more kinds.

When two or more kinds of solvents are used, a mixture of a solvent having a hydroxyl group or a solvent not having a hydroxyl group is preferable. The mass ratio of a solvent having a hydroxyl group with respect to a solvent not having a hydroxyl group is from 1/99 to 99/1, preferably 10/90 to 90/10, further preferably 20/80 to 80/20. In particular, a mixture of propylene glycol monomethyl ether acetate (PGMEA) and propylene glycol monomethyl ether (PGME) (mass ratio: 60/40) is preferable.

In order to improve permeability of the cleaning liquid with respect to the polymerizable composition, the cleaning liquid may contain a surfactant previously mentioned as the surfactant that may be included in the polymerizable composition.

<Exposure Process>

In the exposure process, the polymerizable composition layer formed in the polymerizable composition layer formation process is exposed to light in a patterned manner. The pattern exposure is usually performed by a method including exposing the layer to light via a mask so that only exposed portions of the layer are cured. However, the pattern exposure may be performed by scanning exposure in some cases according to purposes.

The exposure is preferably performed by radiation irradiation, and the radiation used for exposure is particularly preferably ultraviolet rays such as g-line rays or i-line rays, and a high-pressure mercury lamp is most preferably used. The irradiation intensity is preferably from 5 mJ/cm$^2$ to 1,500 mJ/cm$^2$, more preferably from 10 mJ/cm$^2$ to 1,000 mJ/cm$^2$, and most preferably from 10 mJ/cm$^2$ to 800 mJ/cm$^2$.

<Development Process>

Subsequent to the exposure process, an alkali development treatment (development process) is carried out by allowing the unexposed portions to dissolve in an alkaline aqueous solution. Through this process, only the exposed and cured portions remain on the support.

The developer is desirably an organic alkaline developer that does not cause damage to a circuit formed underneath, or the like. The developing temperature is usually from 20° C. to 30° C. and the developing time is from 20 seconds to 90 seconds.

Examples of the alkali developer include an alkali aqueous solution obtained by diluting an organic alkali compound with purified water so that the concentration of the organic alkali compound is from 0.001% by mass to 10% by mass, preferably from 0.01% by mass to 1% by mass, and examples of the organic alkali compound include aqueous ammonia, ethylamine, diethylamine, dimethylethanolamine, tetramethylammonium hydroxide, tetraethylammonium hydroxide, choline, pyrrole, piperidine, and 1,8-diazabicyclo-[5.4.0]-7-undecene.

The development may be performed using an inorganic alkali, and preferred examples thereof include sodium hydroxide, potassium hydroxide, sodium carbonate, sodium hydrogen carbonate, sodium silicate and sodium metasilicate.

When an alkali aqueous solution as described above is used as a developer, the color filter is usually washed (rinsed) with purified water after the development process.

The method for manufacturing the color filter of the invention may include, after carrying out the colored polymerizable composition layer formation process, the exposure process and the development process, a curing process for curing the formed colored pattern by heating and/or exposing to light, as required.

A color filter having a desired color hue can be produced by repeating the colored polymerizable composition layer formation process, the exposure process and the development process (further, as required, the curing process) for a number of times corresponding to the number of colors that form the color filter.

<Solid-State Image Sensor>

The solid-state image sensor of the invention includes the color filter of the invention.

Since the color filter of the invention is formed from the polymerizable composition for color filters of the invention, the colored pattern exhibits high adhesion with respect to a support and the cured composition exhibits excellent development resistance. Therefore, a pattern having a high resolution that exhibits excellent exposure sensitivity, favorable adhesion of exposed portions with respect to a support, and realizes a favorable cross-sectional shape, can be obtained. Accordingly, the color filter is suitably used for liquid crystal display devices and solid-state image sensors, such as CCD imaging devices and CMOS imaging devices, and particularly suitably used for high-resolution CCD imaging devices, CMOS imaging devices or the like that have more than 1 million pixels. More specifically, the color filter of the invention is suitable for solid-state image sensors.

The color filter of the invention can be used, for example, as a color filter disposed between a light-receiving portion of each pixel and a light-condensing microlens that form a solid-state image sensor.

(Cured Film Formed from Polymerizable Composition)

In the invention, one major feature of the cured film formed from the polymerizable composition of the invention is suppressed coloration due to heating after the development and/or a lapse of time.

In the invention, the degree of coloration of the cured film can be evaluated by a color difference $\Delta Eab^*$. The color difference $\Delta Eab^*$ can be measured with a colorimeter (MCPD-3000, trade name, manufactured by Otsuka Electronics Co., Ltd.)

The conditions for evaluation are as follows. First, a cured film is formed by exposing the polymerizable composition of the invention at different exposure amounts ranging from 10 mJ/cm$^2$ to 2500 mJ/cm$^2$ with a proximity exposure device (manufactured by Hitachi High-Tech Electronics Engineering Co., Ltd.) with an ultra-high pressure mercury lamp, or an i-line stepper exposure device (365 nm, trade name: FPA-3000i5+, manufactured by Canon Inc.) The obtained cured film is developed as desired, and then heated at 200° C. for 1 hour.

By measuring the color difference $\Delta Eab^*$ of the cured film at different times of before and after the heating, the state of coloration due to heat and/or time of the cured film can be evaluated.

According to the photopolymerizable composition of the invention, the color difference $\Delta Eab^*$ between before and after the heating can be adjusted to 5 or lower.

Since the cured film obtained in the invention exhibit favorable pattern formation suitability and suppressed coloration due to heat or time, it is also suitably used for other purposes than color filters, such as molding resins, injection-molding resins, photo-molding resins, sealing agents, polymerizable materials for dental use, printing inks, paints, photosensitive resins for printing plate, color proofs for printing, resists for printed board, resists for manufacturing semiconductors, resists for microelectronics, resists for producing units for micro machines, insulating materials, hologram materials, materials for forming a wafer level lens or a light blocking film for the lens, materials for waveguides, overcoat agents, adhesives, pressure-sensitive adhesives, releasable coating agents, and the like.

Further, the cured film can be used also as a planarizing film or a protection film for solid-state image sensors, or as a planarizing film or an interlayer insulating film for a color filter of liquid crystal display devices or organic EL display devices.

The following are exemplary embodiments of the invention. However, the invention is not limited to these embodiments.

<1> A polymerizable composition comprising an oxime ester photopolymerization initiator, an organic acid anhydride having a molecular weight of 300 or less, and a polymerizable compound.

<2> The polymerizable composition according to <1>, wherein the organic acid anhydride has a boiling point of from 100° C. to 200° C.

<3> The polymerizable composition according to <1> or <2>, wherein a mass ratio of the oxime ester photopolymerization initiator to the organic acid anhydride is from 20:1 to 1:1.

<4> The polymerizable composition according to any of <1> to <3>, wherein the oxime ester photopolymerization initiator comprises a compound represented by the following Formula (1):

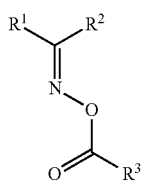
(1)

wherein in Formula (1), $R^1$ represents an aryl group, a heteroaryl group or an acyl group; $R^2$ represents an alkyl group, an aryl group, a heteroaryl group or an acyl group; $R^3$ represents an alkyl group, an aryl group or an alkoxy group; and $R^1$ and $R^2$ may form a ring together with at least one oxygen or sulfur atom and at least one divalent organic group.

<5> The polymerizable composition according to <4>, wherein the oxime ester photopolymerization initiator represented by Formula (1) is a compound represented by the following Formula (2):

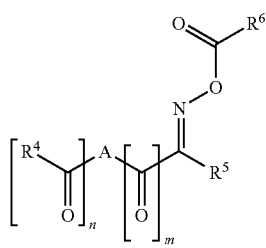
(2)

wherein in Formula (2), A represents an aromatic group or a heteroaromatic group; $R^4$ represents an alkyl group, an aryl group or a heteroaryl group; $R^5$ represents an alkyl group, an aryl group, a heteroaryl group or an acyl group; A and $R^5$ may form a ring together with at least one oxygen or sulfur atom and at least one divalent organic group; $R^6$ represents an alkyl group having 8 or less carbon atoms or an aryl group having 8 or less carbon atoms; n is 0 or 1; and m is 0 or 1.

<6> The polymerizable composition according to <4>, wherein the oxime ester photopolymerization initiator represented by Formula (1) is a compound represented by the following Formula (3) or Formula (4):

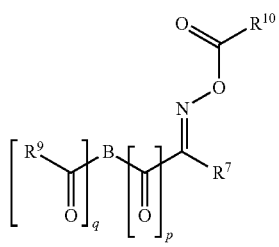
(3)

wherein in Formula (3), $R^7$ represents an alkyl group having a —SAr group; $R^9$ represents an alkyl group, an aryl group or a heteroaryl group; $R^{19}$ represents an alkyl group having 8 or less carbon atoms or an aryl group having 8 or less carbon atoms; Ar represents an aryl group; B represents a substituent selected from the following Group B; p is 0 or 1; and q is 0 or 1;

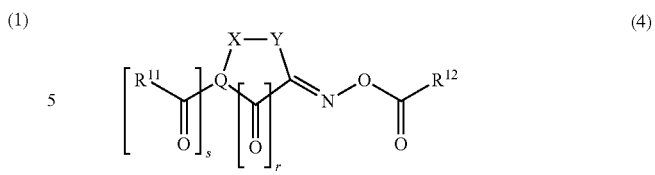
(4)

wherein in Formula (4), X represents a oxygen atom or a sulfur atom; Y represents a divalent alkylene group; $R^{11}$ represents an alkyl group, an aryl group or a heteroaryl group; $R^{12}$ represents an alkyl group having 8 or less carbon atoms or an aryl group having 8 or less carbon atoms; Q represents a substituent selected from Group B from which one hydrogen atom is removed to form a ring together with X—Y; r is 0 or 1; and s is 0 or 1; and wherein in the following Group B, $R^8$ represents an alkyl group or an aryl group:

Group B

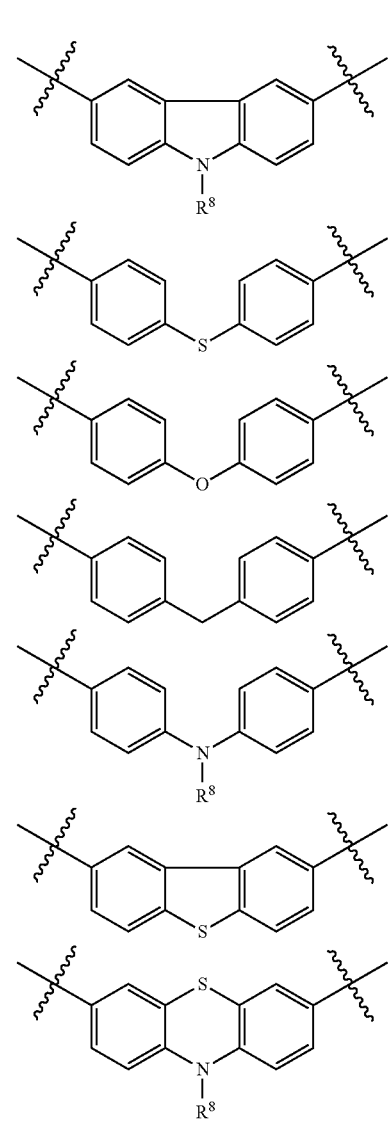

-continued

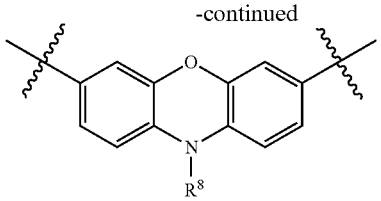

<7> The polymerizable composition according to <5>, wherein the organic acid anhydride comprises a compound represented by the following Formula (5):

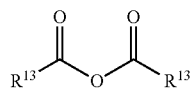

(5)

wherein in Formula (5), two of $R^{13}$ are the same as each other and represent an alkyl group having 8 or less carbon atoms or an aryl group having 8 or less carbon atoms, the alkyl group or the aryl group being the same substituent as $R^6$ in Formula (2).

<8> The polymerizable composition according to <6>, wherein the organic acid anhydride comprises a compound represented by the following Formula (5):

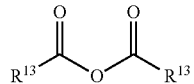

(5)

wherein in Formula (5), two of $R^{13}$ are the same as each other and represent an alkyl group having 8 or less carbon atoms or an aryl group having 8 or less carbon atoms, the alkyl group or the aryl group being the same substituent as $R^{10}$ in Formula (3) or $R^{12}$ in Formula (4).

<9> The polymerizable composition according to <7>, wherein $R^6$ in Formula (2) and $R^{13}$ in Formula (5) are each a methyl group.

<10> The polymerizable composition according to <8>, wherein $R^{10}$ in Formula (3) or $R^{12}$ in Formula (4) and $R^{13}$ in Formula (5) are each a methyl group.

<11> The polymerizable composition according to any of <1> to <10>, further comprising a colorant.

<12> The polymerizable composition according to <11>, wherein the colorant comprises a dye.

<13> The polymerizable composition according to <11>, wherein the colorant comprises titanium black.

<14> The polymerizable composition according to <11>, further comprising a dispersant.

<15> Use of the polymerizable composition according to any of <1> to <10> for forming a color filter.

<16> A cured film formed by using the polymerizable composition according to any of <1> to <10>.

<17> A color filter having a patterned region on a support, the patterned region being formed by using the polymerizable composition according to any of <1> to <10>.

<18> A method of producing a color filter, the method comprising:

forming a polymerizable composition layer by applying the polymerizable composition according to any of <1> to <10> onto a support;

exposing the polymerizable composition layer to light in a patterned manner; and forming a colored pattern by developing the exposed polymerizable composition layer.

<19> A solid-state image sensor comprising the color filter according to <17>.

EXAMPLES

Hereinafter, the invention will be more specifically described with reference to the Examples, but the invention is not limited to the Examples. Unless otherwise specified, "part" and "%" are based on mass.

The oxime ester photopolymerization initiator, the organic acid anhydride having a molecular weight of 300 or lower and an organic acid anhydride having a molecular weight of 300 or more, which is a comparative compound, used in the Examples are shown below.

| Compound No. | Oxime Ester Photopolymerization Initiator |
|---|---|
| (A)-1 | 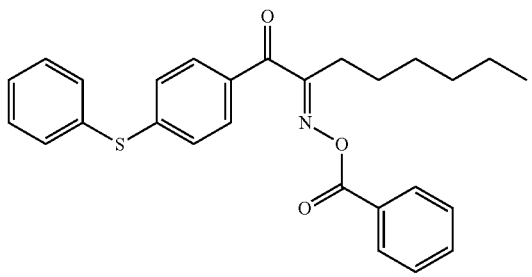 |

IRGACURE-OXE01(manufactured by BASF Japan Ltd.)

-continued

| Compound No. | Oxime Ester Photopolymerization Initiator |
| --- | --- |
| (A)-2 | IRGACURE-OXE02(manufactured by BASF Japan Ltd.) |
| (A)-3 | CGI-325(manufactured by BASF Japan Ltd.) |
| (A)-4 | |
| (A)-5 | |
| (A)-6 | |

| Compound No. | Acid Anhydride | Molecular Weight | Boiling Point (° C./760 mmHg) |
|---|---|---|---|
| (B)-1 |  | 102.09 | 139 |
| (B)-2 | 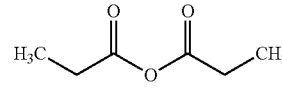 | 130.14 | 168 |
| (B)-3 | 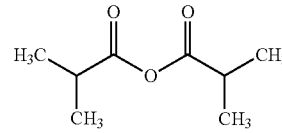 | 158.19 | 182 |
| (B)-4 | 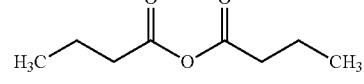 | 158.19 | 201 |
| (B)-5 | 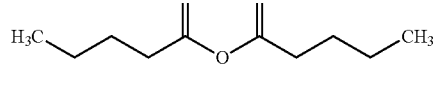 | 186.13 | 227 |
| (B)-6 | 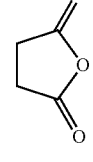 | 100.07 | 260 |
| (B)-7 | 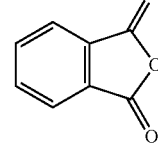 | 148.12 | 284 |
| (B)-8 | 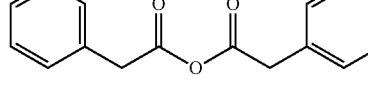 | 254.28 | >300 |
| (B)-9 | 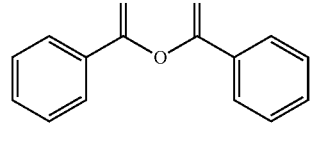 | 226.23 | 360 |
| (B)-10 | 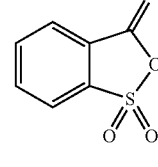 | 184.17 | >300 |
| (B)'-1 | 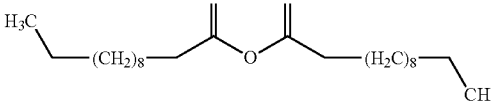 | 382.62 | 380 |

Example 1-1

Green Polymerizable Composition with Pigment Green 58

[1. Preparation of Colored Polymerizable Composition A-1]

A green colored polymerizable composition A-1 containing Pigment Green 58 as a coloring material was prepared.

1-1. Preparation of Pigment Dispersion (P1)

A mixed liquid containing 40 parts of a mixture of C.I. Pigment Green 58 and C. I. Pigment Yellow 180 (mass ratio: 30/70) as a pigment, 10 parts (solid content: approximately 4.51 parts) of BYK 2001 (trade name, manufactured by BYK Japan K.K., solid content concentration: 45.1%) as a dispersant, and 150 parts of ethyl 3-ethoxypropionate as a solvent were mixed and dispersed with a bead mill for 15 hours to prepare a pigment dispersion (P1).

The average particle diameter of the obtained pigment dispersion (P1) was measured by a dynamic light scattering method. The result was 200 nm.

1-2. Preparation of Colored Polymerizable Composition A-1

The following composition A-1 was mixed and dissolved, thereby preparing a green colored polymerizable composition A-1.

<Composition A-1>

| | |
|---|---|
| Pigment dispersion (P1) | 600 parts |
| Binder: benzyl methacrylate/methacrylic acid/hydroxyethyl methacrylate copolymer (mol ratio: 80/10/10, Mw: 10,000) | 200 parts |
| Polymerizable compound: dipentaerythritol hexaacrylate | 60 parts |
| Oxime ester photopolymerization initiator: (A)-1 | 20 parts |
| Acid anhydride: (B)-9 | 1 part |
| Organic solvent: propyleneglycol monomethyl ether acetate (PGMEA) | 1,000 parts |
| Surfactant (trade name: TETRONIC 150R1, manufactured by BASF Japan Ltd.) | 1 part |
| Adhesion improving agent: γ-methacryloxypropyl triethoxysilane | 5 parts |

[2. Performance Evaluation]

The remaining amount of the photopolymerization initiator immediately after the preparation of the colored polymerizable composition and after storing the polymerizable composition over time, the exposure sensitivity, the surface roughness of the obtained colored pattern, and the residues at unexposed portions were evaluated in accordance with the following methods. The evaluation results are shown in Table 1.

<Method for Measuring Remaining Amount of Photopolymerization Initiator in Colored Polymerizable Composition>

The remaining amount of the photopolymerization initiator in the colored polymerizable composition was quantified using a high performance liquid chromatograph (manufactured by Waters, Model No. 2695, columns: trade name: SHIM-PACK CLC-ODS, manufactured by Shimadzu, Ltd., column temperature: 40° C.).

Specifically, 1 g of the colored polymerizable composition was diluted with 100 mL of acetonitrile, allowed to dissolve for 5 minutes by applying ultrasonic waves, and the resultant was filtered using a filter. 10 μL of the filtrate was measured for 45 minutes under the liquid supply condition of acetonitrile/buffer (phosphoric acid/triethylamine=0.1%/0.1%)=90/10. The area % of the main peak of the initiator at a detection wavelength of 300 nm was defined as the initiator remaining ratio %, and the area % of the hydrolysate peak was defined as the hydrolysis ratio %.

A sample of the colored polymerizable composition, which was measured immediately after the preparation of the colored polymerizable composition, is referred to as a fresh sample, and a sample of the colored polymerizable composition, which was measured after being contained in a closed container after the preparation and allowed to stand for three days in a 45° C. thermostat bath, and then allowed to return to room temperature, is referred to as an aged sample.

2-1. Exposure Sensitivity of Colored Polymerizable Composition (Fresh)

The colored polymerizable composition immediately after the preparation was applied onto a glass substrate by spin coating, and then dried to form a coating film having a film thickness of 1.0 μm. The spin coating was performed at 300 rpm for 5 seconds and subsequently at 800 rpm for 20 seconds, and the drying was performed at 100° C. for 80 seconds. The obtained coating film was exposed to light at an exposure dose of from 10 to 1600 mJ/cm$^2$ through a pattern mask having a 1-mm line and space at a wavelength of 365 nm, using an i-line stepper exposure device FPA-3000i5+ (manufactured by Canon. Inc.) Next, the coating film after being exposed was developed at 25° C. for 60 seconds using a developer (60% CD-2000, trade name, manufactured by FUJIFILM Electronics Materials Co.) Thereafter, the resultant coating film was rinsed for 20 seconds with running water, and then air-dried to complete the patterning.

The exposure sensitivity was evaluated according to a value of exposure sensitivity, which was defined by a minimum exposure dose at which the pattern line width after the development at exposed portions was 1.0 μm or more. The smaller the value of exposure sensitivity is, the higher the sensitivity is.

2-2. Exposure Sensitivity of Colored Polymerizable Composition (Aged: Heating at 45° C. for 3 Days)

The exposure sensitivity was determined by a process substantially the same as that of 2-1, except that a colored polymerizable composition after being contained in an closed container after the preparation and allowed to stand for 3 days in a thermocell (EYELA/LTI-700) at 45° C. was used. The sensitivity was defined as the exposure sensitivity of the aged sample.

2-3. Pattern Surface Roughness Evaluation

A substrate having a pattern, which was obtained at a minimum exposure dose at which the pattern line width after the development was 1.0 μm or more in the process 2-1, was heated in an oven at 220° C. for 1 hour. The surface roughness of the colored pattern (colored region) of the substrate was measured with an atomic force microscope (trade name: NANOSCOPE IIIA, manufactured by NanoWorld AG), and the result was evaluated based on the following criteria.

—Evaluation Criteria—

A: Surface roughness (Ra value) is 50 Å or lower.

B: Surface roughness (Ra value) is more than 50 Å and 100 Å or lower.

C: Surface roughness (Ra value) is more than 100 Å and 200 Å or lower.

D: Surface roughness (Ra value) is more than 200 Å.

2-4. Unexposed Portion Residue Evaluation

The same substrate having a pattern used in the evaluation 2-3 was observed with an SEM (magnification: 20,000 times) to see whether residues existed at portions which had not been exposed to light (unexposed portions), and the result was evaluated based on the following criteria.

—Evaluation Criteria—

A: Residues are not observed at all in the unexposed portions.

B: 1 to 3 residues are observed in a 1.0-μm square unexposed portion.

C: More than 3 but not more than 10 residues are observed in a 1.0-μm square unexposed portion.

D: A significant amount of residues are observed in unexposed portions.

In each of the evaluation criteria as mentioned above, grades A to C are acceptable levels for practical application, and grades A and B are levels of exhibiting excellent performance.

Examples 1-2 to 1-20, Comparative Examples 1-1 to 1-4

Colored polymerizable compositions A-2 to A-20 and A'-1 to A'-4 were prepared in a manner substantially the same as the preparation of colored polymerizable composition A-1, except that the type and the amount of the oxime ester photopolymerization initiator and the acid anhydride were changed as shown in Table 1, respectively.

The obtained colored polymerizable compositions A-2 to A-20 and A'-1 to A'-4 were evaluated in a manner substantially the same as Example 1-1. The results are shown in Table 1.

The photopolymerization initiator (A)'-1 and the photopolymerization initiator (A)'-2, used in Comparative Example 1-4, were 2-(2'-chlorophenyl)-4,5-diphenyl imidazole dimer and Michler's ketone, respectively. In Comparative Example 1-4, 4 parts of photopolymerization initiator (A)'-1 and 16 parts of photopolymerization initiator (A)'-2 were used in combination.

From the results shown in Table 1, it is proved that the green colored polymerizable compositions of the Examples, each containing an organic acid anhydride having a molecular weight of 300 or lower ((B)-1 to (B)-9), exhibit a high initial exposure sensitivity and substantially no reduction sensitivity after being heated over time, thereby showing favorable storability of the colored polymerizable composition. The initiator remaining ratio % of the polymerizable compositions of each of the Examples is high, and no hydrolysates are observed. In contrast, in the polymerizable compositions of Comparative Examples 1-1 to 1-3, the initiator remaining ratio % is low in the aged samples, and the hydrolysis ratio % is high.

In view of these results, the reason why reduction in sensitivity is not observed in the polymerizable compositions of the Examples is considered to be that hydrolysis of the oxime ester photopolymerization initiator is suppressed. Moreover, from the results of Comparative Example 1-4, in which the oxime ester photopolymerization initiator is not used, the sensitivity is low from an early stage of the preparation of the polymerizable composition.

Furthermore, it is found that the addition of an acid anhydride having a molecular weight of 300 or lower results in a flat pattern having a small surface roughness, and a favorable developability with suppressed generation of development residues at unexposed portions. It is found that the addition of an acid anhydride having a molecular weight of 300 or lower results in an excellent pattern formability. This effect is particularly remarkable when the acid anhydride has a low boiling point.

It is found that a combination of the oxime ester photopolymerization initiator and the acid anhydride enables high sensitivity and excellent storage stability.

TABLE 1

| Colored Polymerizable Composition | Photopolymerization Initiator Type | Content (Part) | Acid Anhydride Type | Content (Part) | Initiator Remaining Ratio % Hydrolysis Ratio % in <> Fresh Sample | Aged Sample (45° C., 3 days) | Exposure Sensitivity (mJ/cm²) Fresh Sample | Aged Sample (45° C., 3 days) | Surface Roughness | Unexposed Portion Residue |
|---|---|---|---|---|---|---|---|---|---|---|
| Ex. 1-1  | A-1  | (A)-1 | 20 | (B)-9 | 1   | 97<0> | 95<0> | 1000  | 1100  | B | C |
| Ex. 1-2  | A-2  | (A)-2 | 20 | (B)-1 | 1   | 97<0> | 97<0> | 900   | 900   | A | A |
| Ex. 1-3  | A-3  | (A)-3 | 20 | (B)-1 | 1   | 99<0> | 99<0> | 700   | 700   | A | B |
| Ex. 1-4  | A-4  | (A)-4 | 20 | (B)-1 | 1   | 99<0> | 99<0> | 400   | 400   | A | A |
| Ex. 1-5  | A-5  | (A)-4 | 20 | (B)-2 | 1   | 97<0> | 95<0> | 400   | 410   | B | B |
| Ex. 1-6  | A-6  | (A)-4 | 20 | (B)-3 | 1   | 98<0> | 95<0> | 400   | 420   | B | B |
| Ex. 1-7  | A-7  | (A)-4 | 20 | (B)-4 | 1   | 98<0> | 94<0> | 400   | 420   | B | B |
| Ex. 1-8  | A-8  | (A)-4 | 20 | (B)-5 | 1   | 97<0> | 93<0> | 400   | 420   | C | C |
| Ex. 1-9  | A-9  | (A)-4 | 20 | (B)-6 | 1   | 98<0> | 92<0> | 400   | 420   | C | B |
| Ex. 1-10 | A-10 | (A)-4 | 20 | (B)-7 | 1   | 97<0> | 91<0> | 400   | 430   | C | C |
| Ex. 1-11 | A-11 | (A)-4 | 20 | (B)-8 | 1   | 98<0> | 91<0> | 400   | 430   | B | C |
| Ex. 1-12 | A-12 | (A)-4 | 20 | (B)-9 | 1   | 98<0> | 92<0> | 400   | 430   | C | C |
| Ex. 1-13 | A-13 | (A)-5 | 20 | (B)-1 | 1   | 97<0> | 96<0> | 350   | 350   | B | A |
| Ex. 1-14 | A-14 | (A)-6 | 20 | (B)-1 | 1   | 97<0> | 97<0> | 300   | 300   | A | A |
| Ex. 1-15 | A-15 | (A)-4 | 20 | (B)-1 | 0.5 | 98<0> | 97<1> | 400   | 430   | B | B |
| Ex. 1-16 | A-16 | (A)-4 | 20 | (B)-1 | 2   | 98<0> | 98<0> | 400   | 400   | A | A |
| Ex. 1-17 | A-17 | (A)-4 | 20 | (B)-1 | 4   | 98<0> | 98<0> | 400   | 400   | A | A |
| Ex. 1-18 | A-18 | (A)-4 | 20 | (B)-1 | 5   | 98<0> | 98<0> | 400   | 400   | B | B |
| Ex. 1-19 | A-19 | (A)-4 | 20 | (B)-1 | 8   | 99<0> | 99<0> | 400   | 400   | C | B |
| Ex. 1-20 | A-20 | (A)-4 | 20 | (B)-1 | 10  | 99<0> | 99<0> | 400   | 400   | C | C |
| Comp. 1-1 | A'-1 | (A)-1 | 20 | —      | —   | 95<5> | 80<20> | 1050 | 1700  | C | B |
| Comp. 1-2 | A'-2 | (A)-4 | 20 | —      | —   | 98<2> | 72<23> | 750  | 1500  | B | C |
| Comp. 1-3 | A'-3 | (A)-4 | 20 | (B)'-1 | 1   | 95<2> | 85<4>  | 500  | 750   | D | D |
| Comp. 1-4 | A'-4 | (A)'-1 | 4 | (B)'-1 | 1   | 98<0> | 98<0>  | >2000 | >2000 | D | D |
|           |      | (A)'-2 | 16 |        |     | 98<0> | 98<0>  |       |       |   |   |

Example 2-1

Blue Polymerizable Composition with Pyrromethene Compound [1. Preparation of Resist Liquid for undercoating]

The following composition was mixed and dissolved, thereby preparing a resist liquid for undercoating.

—Composition of Resist Liquid for Undercoating—

| | |
|---|---|
| PGMEA | 19.20 parts |
| Ethyl lactate | 36.67 parts |
| Resin: 40% PGMEA solution of benzyl methacrylate/methacrylic acid/hydroxyethyl methacrylate copolymer (mol ratio: 60/22/18, Mw: 20,000) | 30.51 parts |
| Polymerizable compound: dipentaerythritol hexaacrylate | 12.20 parts |
| Polymerization inhibitor: p-methoxy phenol | 0.0061 parts |
| Fluorosurfactant: F-475 (trade name, manufactured by DIC Corporation) | 0.83 parts |
| Photopolymerization initiator: TAZ-107 (trade name, trihalomethyl triazine photopolymerization initiator, manufactured by Midori Chemical Co., Ltd.) | 0.586 parts |

[2. Production of Silicon Wafer Substrate with Undercoat Layer]

A 6-inch silicon wafer was heated in an oven at 200° C. for 30 minutes. Subsequently, the resist liquid was applied onto the silicon wafer so as to give a dry film thickness of 2 μm, and was then dried by heating in an oven at 220° C. for 1 hour, thereby forming an undercoat layer. A silicon wafer substrate with an undercoat layer was thus obtained.

[3. Preparation of Colored Polymerizable Composition B-1]

—Preparation of C. I. Pigment Blue 15:6 Dispersion—

A mixed liquid containing 11.5 parts of C. I. Pigment Blue 15:6 (average particle size: 55 nm), 3.5 parts of a dispersant (BY-161, trade name, manufactured by BYK Japan K.K.) and 85 parts of PGMEA was mixed and dispersed with a bead mill (zirconia bead diameter: 0.3 mm) for 3 hours. Thereafter, the mixture was further dispersed at a flow rate of 500 g/min under a pressure of 2000 kg/cm$^3$ using a high-pressure dispersion device with a decompression mechanism (NANO-3000-10, trade name, manufactured by Japan BEE). The dispersion treatment was repeated 10 times, thereby obtaining a pigment dispersion. The average primary particle diameter of the pigment in the pigment dispersion was measured by a dynamic light scattering method with a particle size analyzer (NANOTRAC UPA-EX150, trade name, manufactured by Nikkiso Co., Ltd.). The result was 25 nm.

The following composition B-1 was mixed and dissolved, thereby obtaining a colored polymerizable composition B-1 containing a coloring material (pigment and dye).

<Composition B-1>

| | |
|---|---|
| Solvent: PGMEA | 21.09 parts |
| Polymerizable compound 1 (following structure) | 0.582 parts |
| Polymerizable compound 2 (following structure) | 0.582 parts |
| Photopolymerization initiator: (A)-1 | 0.360 parts |
| Acid anhydride: (B)-9 | 0.018 parts |
| Coloring material (dye compound 1, following structure) | 1.200 parts |
| C. I. Pigment Blue 15:6 dispersion (solid content concentration: 13.17%, pigment concentration: 10.13%) | 24.8766 parts |
| Surfactant: (F-781, trade name, 1.0% solution of PGMEA, manufactured by DIC Corporation) | 1.250 parts |
| Polymerization inhibitor: p-methoxy phenol (1.0% solution of PGMEA) | 0.060 parts |

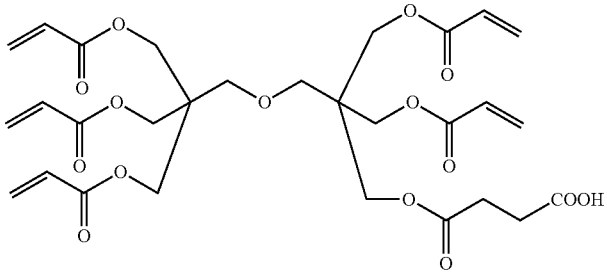 [SMILES: C=CC(=O)OCC(COCC(COC(=O)C=C)(COC(=O)C=C)COC(=O)CCC(=O)O)(COC(=O)C=C)COC(=O)C=C]

7:3 Mixture

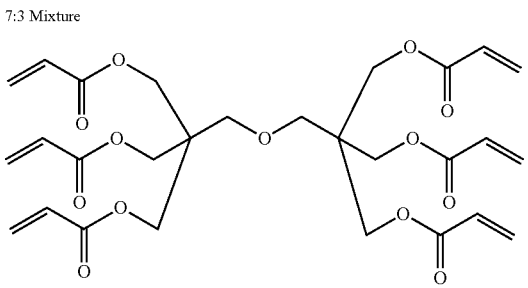

Polymerizable Compound 1

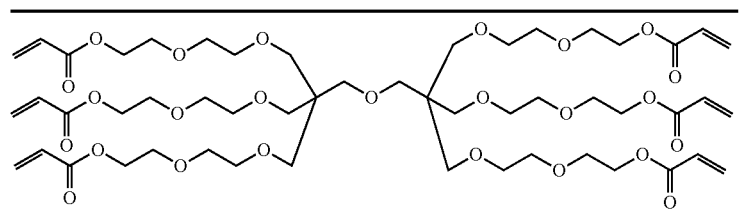
Polymerizable Compound 2

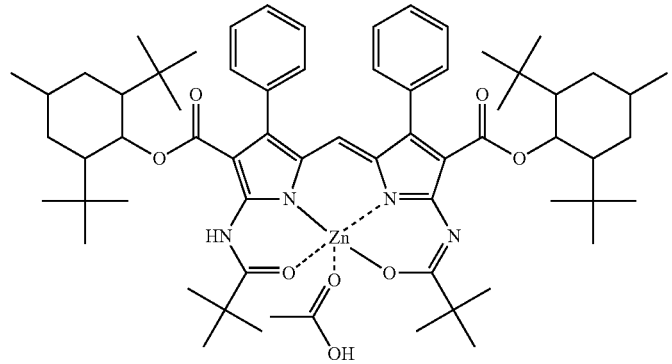
Dye Compound 1

[4. Production and Evaluation of Color Filter using Colored Polymerizable Composition B-1]

The colored polymerizable composition B-1 prepared in process 3 was applied onto the undercoat layer of the silicon wafer substrate with the undercoat layer obtained in process 2, and a coating film was formed from the polymerizable composition such that the dry film thickness was 0.6 μm, and was subjected to a heat-treatment (pre-baking) for 120 seconds with a hot plate at 100° C.

Subsequently, the coating film was exposed to light at an exposure dose of 10 to 1600 mJ/cm² through an island pattern mask having a 1.0-μm square pattern, at a wavelength of 365 nm using an i-line stepper exposure device (FPA-3000i5+, trade name, manufactured by Canon. Inc.)

Thereafter, the silicon wafer substrate on which the exposed coating film was formed was placed on a horizontal rotating table of a spin shower development device (product type: DW-30, manufactured by Chemitronics Co., Ltd.), and was then subjected to a paddle development at 23° C. for 60 seconds with a developer (CD-2000, trade name, manufactured by FUJIFILM Electronics Materials. Co.), thereby forming a colored pattern on the silicon wafer substrate.

The silicon wafer substrate on which the colored pattern was formed was fixed on the horizontal rotating table with a vacuum chuck system, and the silicon wafer substrate was rinsed by supplying pure water from the upper portion of the center of the rotation in the shape of a shower from jet nozzles while rotating the silicon wafer substrate at a rotation rate of 50 rpm by a rotating device, and the substrate was spray-dried.

A color filter having a colored pattern formed on a substrate was thus obtained.

The photopolymerization initiator remaining amount was measured immediately after the preparation of the colored polymerizable composition and after storing the polymerizable composition over time, and the results were evaluated in the same manner as Example 1-1. The exposure sensitivity, the surface roughness of the obtained colored pattern, and the generation of residues at unexposed portions were evaluated in the same manner as Example 1-1, using the color filter having the colored pattern formed thereon obtained in process 4. The exposure sensitivity was evaluated according to a value of exposure sensitivity, which was defined by a minimum exposure dose at which the pattern line width after the development at exposed portions was 1.0 μm or more. The results are shown in Table 2.

Examples 2-2 to 2-14 and Comparative Examples 2-1 to 2-3

Colored polymerizable compositions B-2 to B-14 and B'-1 to B'-3 were prepared in the same manner as the composition B-1, except that the type and the amount of the oxime ester photopolymerization initiator and the organic acid anhydride were changed as shown in Table 2, respectively. The same evaluations carried out in Example 2-1 were performed using the obtained colored polymerizable compositions B-2 to B-14 and B'-1-B'-3. The results are shown in Table 2.

TABLE 2

| Colored Polymerizable Composition | Photopolymerization Initiator | | Acid Anhydride | | Initiator Remaining Ratio % Hydrolysis Ratio % in <> | | Exposure Sensitivity (mJ/cm²) | | Surface Roughness | Unexposed Portion Residue |
| | Type | Content (Part) | Type | Content (Part) | Fresh Sample | Aged Sample (45° C., 3 days) | Fresh Sample | Aged Sample (45° C., 3 days) | | |
|---|---|---|---|---|---|---|---|---|---|---|
| Ex. 2-1 | B-1 | (A)-1 | 0.36 | (B)-9 | 0.018 | 97<0> | 93<1> | 1000 | 1200 | B | C |
| Ex. 2-2 | B-2 | (A)-1 | 0.36 | (B)-1 | 0.018 | 97<0> | 97<0> | 900 | 900 | A | A |
| Ex. 2-3 | B-3 | (A)-2 | 0.36 | (B)-1 | 0.018 | 99<0> | 99<0> | 700 | 700 | A | B |
| Ex. 2-4 | B-4 | (A)-3 | 0.36 | (B)-1 | 0.018 | 99<0> | 99<0> | 700 | 700 | A | A |

TABLE 2-continued

| | Colored Polymerizable Composition | Photopolymerization Initiator Type | Photopolymerization Initiator Content (Part) | Acid Anhydride Type | Acid Anhydride Content (Part) | Initiator Remaining Ratio % Hydrolysis Ratio % in <> Fresh Sample | Initiator Remaining Ratio % Hydrolysis Ratio % in <> Aged Sample (45° C., 3 days) | Exposure Sensitivity (mJ/cm²) Fresh Sample | Exposure Sensitivity (mJ/cm²) Aged Sample (45° C., 3 days) | Surface Roughness | Unexposed Portion Residue |
|---|---|---|---|---|---|---|---|---|---|---|---|
| Ex. 2-5 | B-5 | (A)-4 | 0.36 | (B)-1 | 0.018 | 97<0> | 97<0> | 500 | 500 | A | A |
| Ex. 2-6 | B-6 | (A)-5 | 0.36 | (B)-1 | 0.018 | 98<0> | 98<0> | 400 | 400 | A | A |
| Ex. 2-7 | B-7 | (A)-6 | 0.36 | (B)-1 | 0.018 | 98<0> | 98<0> | 350 | 350 | A | A |
| Ex. 2-8 | B-8 | (A)-5 | 0.36 | (B)-2 | 0.018 | 97<1> | 93<2> | 400 | 420 | B | B |
| Ex. 2-9 | B-9 | (A)-5 | 0.36 | (B)-3 | 0.018 | 98<1> | 92<4> | 400 | 420 | B | B |
| Ex. 2-10 | B-10 | (A)-5 | 0.36 | (B)-4 | 0.018 | 97<1> | 91<4> | 400 | 430 | C | C |
| Ex. 2-11 | B-11 | (A)-5 | 0.36 | (B)-1 | 0.009 | 98<0> | 95<3> | 400 | 450 | B | B |
| Ex. 2-12 | B-12 | (A)-5 | 0.36 | (B)-1 | 0.036 | 98<0> | 98<0> | 400 | 400 | A | A |
| Ex. 2-13 | B-13 | (A)-5 | 0.36 | (B)-1 | 0.09 | 98<0> | 98<0> | 400 | 400 | A | A |
| Ex. 2-14 | B-14 | (A)-5 | 0.36 | (B)-1 | 0.108 | 98<0> | 98<0> | 400 | 400 | B | C |
| Comp. 2-1 | B'-1 | (A)-2 | 0.36 | — | — | 92<5> | 80<20> | 1050 | >2000 | B | B |
| Comp. 2-2 | B'-2 | (A)-5 | 0.36 | — | — | 80<20> | 37<60> | 750 | >2000 | B | B |
| Comp. 2-3 | B'-3 | (A)-5 | 0.36 | (B)'-1 | 0.018 | 84<10> | 75<10> | 500 | 850 | D | D |

From the results shown in Table 2, it is proved that the blue colored polymerizable compositions of the Examples, each containing an organic acid anhydride having a molecular weight of 300 or lower ((B)-1 to (B)-4 and (B)-9), exhibit a high initial exposure sensitivity and substantially no reduction sensitivity after being heated over time, thereby showing favorable storability of the colored polymerizable composition. The initiator remaining ratio % of the polymerizable compositions of each of the Examples is high, and the hydrolysis ratio % is low. In contrast, in the polymerizable compositions of the Comparative Examples, the initiator remaining ratio % is low particularly in the aged samples, and the hydrolysis ratio % is high.

In view of these results, the reason why reduction in sensitivity is not observed in the polymerizable compositions of the Examples is considered to be that hydrolysis of the oxime ester photopolymerization initiator is suppressed.

Furthermore, it is found that the addition of an acid anhydride having a molecular weight of 300 or lower results in a flat pattern having a small surface roughness, and a favorable developability with suppressed generation of development residues at unexposed portions. It is found that the addition of an acid anhydride having a molecular weight of 300 or lower results in an excellent pattern formability. This effect is particularly remarkable when the acid anhydride has a low boiling point.

Example 3-1

Red Colored Polymerizable Composition

—Preparation of C. I. Pigment Red 254 Dispersion—

A mixed liquid containing 14.0 parts of C. I. Pigment Red 254 (average particle size: 75 nm), 4.0 parts of a pigment dispersant (BY-161, trade name, manufactured by BYK Japan K.K.) and 85 parts of PGMEA was mixed and allowed to disperse with a bead mill (zirconia bead diameter: 0.3 mm) for 3 hours. Thereafter, the mixture was further dispersed at a flow rate of 500 g/min under a pressure of 2000 kg/cm³ using a high-pressure dispersion device with a decompression mechanism (NANO-3000-10, trade name, manufactured by Japan BEE). The dispersion treatment was repeated 10 times, thereby obtain a pigment dispersion. The average primary particle diameter of the pigment of the pigment dispersion was measured by a dynamic light scattering method with a particle diameter analyzer (NANOTRAC UPA-EX150, trade name, manufactured by Nikkiso Co., Ltd.) The result was 30 nm.

—Preparation of C. I. Pigment Yellow 139 Dispersion—

A mixed liquid containing 13.0 parts of C. I. Pigment Yellow 139 (average particle size: 70 nm), 3.0 parts of a pigment dispersant (BY-161, trade name, manufactured by BYK Japan K.K.) and 90 parts of PGMEA was mixed and allowed to disperse with a bead mill (zirconia bead diameter: 0.3 mm) for 3 hours. Thereafter, the mixture was further dispersed at a flow rate of 500 g/min under a pressure of 2000 kg/cm³ using a high-pressure dispersion device with a decompression mechanism (NANO-3000-10, trade name, manufactured by Japan BEE). The dispersion treatment was repeated 10 times, thereby obtaining a pigment dispersion. The average primary particle diameter of the pigment of the pigment dispersion was measured by a dynamic light scattering method with a particle diameter analyzer (NANOTRAC UPA-EX150, trade name, manufactured by Nikkiso Co., Ltd.) The result was 25 nm.

The following composition C-1 was mixed and dissolved, thereby preparing a red colored polymerizable composition C-1 containing a coloring material (pigment).

<Composition C-1>

| | |
|---|---|
| Solvent: ethyl 3-ethoxypropionate | 17.9 parts |
| Coloring material: dispersion of C. I. Pigment Red 254 (solid content: 15% by mass, pigment content in solid content: 60%) | 26.7 parts |
| Coloring material: dispersion of C. I. Pigment Yellow 139 (solid content: 15% by mass, pigment content in solid content: 60%) | 17.8 parts |
| Polymerizable compound: mixture of pentaerythritol triacrylate and dipentaerythritol hexaacrylate (mass ratio 3:7) | 3.5 parts |
| Oxime ester photopolymerization initiator: (A)-1 | 0.5 parts |
| Organic acid anhydride: (B)-9 | 0.1 parts |
| Binder: benzyl methacrylate/methacrylic acid copolymer (mol ratio = 70/30, Mw = 20,000) | 2.0 parts |

The photopolymerization initiator remaining amount was measured immediately after the preparation of the colored polymerizable composition and after storing the polymerizable composition over time, and evaluated in the same manner as Example 2-1. The exposure sensitivity, the surface roughness of the obtained colored pattern, and the generation of residues of unexposed portions were evaluated in the same manner as Example 2-1. The results are shown in Table 3.

Examples 3-2 to 3-15 and Comparative Examples 3-1 to 3-5

Colored polymerizable compositions C-2 to C-15 and C'-1 to C'-5 were prepared in the same manner as polymerizable composition C-1, except that the type and the amount of the oxime ester photopolymerization initiator and the organic acid anhydride were changed as shown in Table 3, respectively. The evaluation was performed in the same manner as Example 2-1 using the obtained colored polymerizable compositions C-2 to C-15 and C'-1 to C'-5. The results are shown in Table 3.

flat pattern having a small surface roughness, and a favorable developability with suppressed generation of development residues at unexposed portions. It is found that the addition of an acid anhydride having a molecular weight of 300 or lower results in an excellent pattern formability. This effect is particularly remarkable when the acid anhydride has a low boiling point.

TABLE 3

| | Colored Polymerizable Composition | Photopolymerization Initiator Type | Content (Part) | Acid Anhydride Type | Content (Part) | Initiator Remaining Ratio % Hydrolysis Ratio % in <> Fresh Sample | Aged Sample (45° C., 3 days) | Exposure Sensitivity (mJ/cm²) Fresh Sample | Aged Sample (45° C., 3 days) | Surface Roughness | Unexposed Portion Residue |
|---|---|---|---|---|---|---|---|---|---|---|---|
| Ex. 3-1 | C-1 | (A)-1 | 0.5 | (B)-9 | 0.1 | 98<0> | 95<1> | 1000 | 1000 | B | C |
| Ex. 3-2 | C-2 | (A)-1 | 0.5 | (B)-1 | 0.1 | 98<0> | 97<0> | 900 | 900 | A | A |
| Ex. 3-3 | C-3 | (A)-2 | 0.5 | (B)-1 | 0.1 | 99<0> | 99<0> | 700 | 700 | A | A |
| Ex. 3-4 | C-4 | (A)-4 | 0.5 | (B)-1 | 0.1 | 99<0> | 99<0> | 500 | 500 | A | A |
| Ex. 3-5 | C-5 | (A)-4 | 0.5 | (B)-2 | 0.1 | 99<0> | 98<0> | 500 | 500 | B | B |
| Ex. 3-6 | C-6 | (A)-4 | 0.5 | (B)-3 | 0.1 | 99<0> | 98<0> | 500 | 500 | B | B |
| Ex. 3-7 | C-7 | (A)-4 | 0.5 | (B)-4 | 0.1 | 99<0> | 98<0> | 500 | 500 | C | B |
| Ex. 3-8 | C-8 | (A)-4 | 0.5 | (B)-5 | 0.1 | 99<0> | 96<0> | 500 | 500 | B | C |
| Ex. 3-9 | C-9 | (A)-4 | 0.5 | (B)-6 | 0.1 | 99<0> | 95<0> | 500 | 500 | B | C |
| Ex. 3-10 | C-10 | (A)-4 | 0.5 | (B)-7 | 0.1 | 99<0> | 95<0> | 500 | 500 | C | C |
| Ex. 3-11 | C-11 | (A)-4 | 0.5 | (B)-1 | 0.012 | 99<0> | 95<4> | 500 | 560 | B | B |
| Ex. 3-12 | C-12 | (A)-4 | 0.5 | (B)-1 | 0.025 | 99<0> | 99<0> | 500 | 500 | A | A |
| Ex. 3-13 | C-13 | (A)-4 | 0.5 | (B)-1 | 0.05 | 99<0> | 99<0> | 500 | 500 | A | A |
| Ex. 3-14 | C-14 | (A)-4 | 0.5 | (B)-1 | 0.125 | 99<0> | 99<0> | 500 | 500 | A | A |
| Ex. 3-15 | C-15 | (A)-4 | 0.5 | (B)-1 | 0.15 | 99<0> | 99<0> | 500 | 500 | B | B |
| Comp. 3-1 | C'-1 | (A)-4 | 0.5 | — | — | 96<2> | 85<9> | 800 | 1300 | C | C |
| Comp. 3-2 | C'-2 | (A)-4 | 0.5 | (B)'-1 | 0.03 | 97<0> | 90<0> | 550 | 700 | D | D |
| Comp. 3-3 | C'-3 | (A)-4 | 0.5 | (B)'-1 | 0.05 | 97<0> | 91<0> | 550 | 650 | D | D |
| Comp. 3-4 | C'-4 | (A)-4 | 0.5 | (B)'-1 | 0.1 | 97<0> | 93<0> | 550 | 600 | D | D |
| Comp. 3-5 | C'-5 | (A)-4 | 0.5 | (B)'-1 | 0.5 | 97<0> | 95<0> | 550 | 600 | D | D |

From the results shown in Table 3, it is proved that the red colored polymerizable compositions of the Examples, each containing an organic acid anhydride having a molecular weight of 300 or lower ((B)-1 to (B)-7 and (B)-9), exhibit a high initial exposure sensitivity and substantially no reduction sensitivity after being heated over time, thereby showing favorable storability of the colored polymerizable composition. The initiator remaining ratio % of the polymerizable compositions of each of the Examples is high, and the hydrolysis ratio % is low. In contrast, in the polymerizable compositions of the Comparative Examples, the initiator remaining ratio % is low particularly in the aged samples, and the hydrolysis ratio % is not detected in the aged samples.

The above results show that hydrolysis is suppressed as a result of using an acid anhydride having a molecular weight of 300 or more (B)'-1. However, the reason for this is considered to be that in addition to generating an oxime ester photopolymerization initiator having a different substituent than the initial substituent, radicals having a large molecular weight are also generated because of the large molecular weight of the acid anhydride, whereby the diffusivity of the radicals is lowered and the ability of initiating polymerization is lowered.

Furthermore, it is found that the addition of an acid anhydride having a molecular weight of 300 or lower results in a Example 4-1

Black Polymerizable Composition

[Preparation of Titanium Black Dispersion A]

The following composition d-1 was subjected to a high viscosity dispersion treatment with two rolls, thereby obtaining a dispersion. Prior to the high viscosity dispersion treatment, the composition d-1 was kneaded by a kneader for 30 minutes.

<Composition d-1>

| | |
|---|---|
| Titanium black (average primary particle diameter: 75 nm, 13M-C, trade name, manufactured by Mitsubishi Materials Corporation) | 35 parts |
| PGMEA | 65 parts |

The following composition d-2 was added to the obtained dispersion, and then stirred for 3 hours using a homogenizer at 3000 rpm. The obtained mixed solution was subjected to a fine dispersion treatment with a dispersion device (trade name: DISPERMAT, manufactured by GETZMANN) using zirconia beads having a diameter of 0.3 mm for 4 hours, thereby obtaining a titanium black dispersion A (hereinafter referred to as a TB dispersion A).

<Composition d-2>

---

Specific Resin 1: 30% PGMEA solution of resin having the following structure (x: 50 mol %, y: 50 mol %, Mw: 30,000)  30 parts

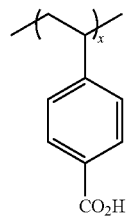
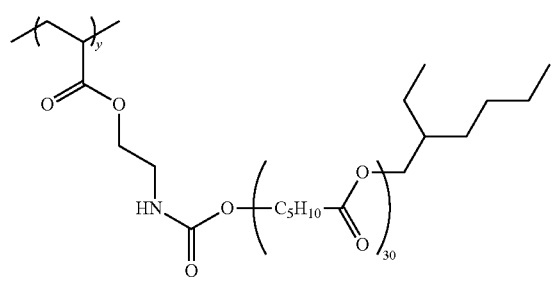

Specific Resin 1

[Preparation of Black Polymerizable Composition D-1]

The following composition D-1 was mixed with a stirrer, thereby preparing a black polymerizable composition D-1.

<Composition D-1>

---

| Binder polymer: benzyl methacrylate/acrylic acid copolymer (benzyl methacrylate/acrylic acid copolymer = 80/20 (% by mass), Mw: 25000) | 2.0 parts |
| Polymerizable compound: dipentaerythritol hexaacrylate | 3.0 parts |
| TB dispersion A liquid (obtained above) | 24.0 parts |
| Solvent: PGMEA | 10 parts |
| Solvent: ethyl-3-ethoxy propionate | 8 parts |
| Oxime ester photopolymerization initiator: (A)-2 | 0.8 parts |
| Organic acid anhydride monomer: (B)-1 | 0.1 parts |
| Polymerization inhibitor: 4-methoxyphenol | 0.01 parts |

Examples 4-2 to 4-15 and Comparative Examples 4-1 to 4-6

Black polymerizable compositions D-2 to D-15 and D'-1 to D'-6 were prepared in the same manner as polymerizable composition D-1, except that the type and the amount of the oxime ester photopolymerization initiator and the organic acid anhydride were changed as shown in Table 4, respectively.

[Evaluation]

The evaluation was performed in the same manner as Example 3-1 using the black polymerizable compositions D-1 to D-15 and D'-1-D'-6. The results are shown in Table 4.

TABLE 4

| | Colored Polymerizable Composition | Photopolymerization Initiator | | Acid Anhydride | | Initiator Remaining Ratio % Hydrolysis Ratio % in <> | | Exposure Sensitivity (mJ/cm$^2$) | | Surface Rough-ness | Unex-posed Portion Residue |
|---|---|---|---|---|---|---|---|---|---|---|---|
| | | Type | Content (Part) | Type | Content (Part) | Fresh Sample | Aged Sample (45° C., 3 days) | Fresh Sample | Aged Sample (45° C., 3 days) | | |
| Ex. 4-1 | D-1 | (A)-2 | 0.8 | (B)-1 | 0.1 | 95<0> | 95<0> | 1200 | 1200 | A | A |
| Ex. 4-2 | D-2 | (A)-2 | 0.8 | (B)-1 | 0.2 | 95<0> | 95<0> | 1000 | 1000 | A | A |
| Ex. 4-3 | D-3 | (A)-2 | 0.8 | (B)-1 | 0.4 | 96<0> | 96<0> | 900 | 900 | A | A |
| Ex. 4-4 | D-4 | (A)-4 | 0.8 | (B)-1 | 0.1 | 95<0> | 95<0> | 600 | 600 | A | A |
| Ex. 4-5 | D-5 | (A)-5 | 0.8 | (B)-1 | 0.1 | 96<0> | 96<0> | 450 | 450 | A | A |
| Ex. 4-6 | D-6 | (A)-5 | 0.8 | (B)-2 | 0.1 | 95<0> | 95<1> | 450 | 450 | B | A |
| Ex. 4-7 | D-7 | (A)-5 | 0.8 | (B)-3 | 0.1 | 95<0> | 95<1> | 450 | 450 | B | B |
| Ex. 4-8 | D-8 | (A)-5 | 0.8 | (B)-4 | 0.1 | 95<0> | 95<1> | 450 | 500 | B | B |
| Ex. 4-9 | D-9 | (A)-5 | 0.8 | (B)-5 | 0.1 | 95<0> | 94<2> | 500 | 550 | C | B |
| Ex. 4-10 | D-10 | (A)-5 | 0.8 | (B)-8 | 0.1 | 95<0> | 93<2> | 500 | 550 | B | C |
| Ex. 4-11 | D-11 | (A)-5 | 0.8 | (B)-9 | 0.1 | 95<0> | 92<2> | 500 | 600 | B | C |
| Ex. 4-12 | D-12 | (A)-5 | 0.8 | (B)-1 | 0.02 | 96<0> | 94<2> | 450 | 500 | B | B |
| Ex. 4-13 | D-13 | (A)-5 | 0.8 | (B)-1 | 0.04 | 96<0> | 96<0> | 450 | 450 | A | A |
| Ex. 4-14 | D-14 | (A)-5 | 0.8 | (B)-1 | 0.2 | 96<0> | 96<0> | 450 | 450 | A | A |
| Ex. 4-15 | D-15 | (A)-5 | 0.8 | (B)-1 | 0.4 | 96<0> | 96<0> | 450 | 450 | B | B |
| Comp. 4-1 | D'-1 | (A)-2 | 0.8 | — | — | 87<10> | 40<57> | 1500 | >2000 | B | C |
| Comp. 4-2 | D'-2 | (A)-2 | 0.8 | (B)'-1 | 0.4 | 89<7> | 54<31> | 1400 | 1600 | D | D |
| Comp. 4-3 | D'-3 | (A)-4 | 0.8 | — | — | 84<14> | 25<60> | 750 | >2000 | C | C |
| Comp. 4-4 | D'-4 | (A)-4 | 0.8 | (B)'-1 | 0.4 | 89<7> | 64<31> | 700 | 1000 | D | D |
| Comp. 4-5 | D'-5 | (A)-5 | 0.8 | — | — | 89<9> | 27<59> | 600 | >2000 | C | C |
| Comp. 4-6 | D'-6 | (A)-5 | 0.8 | (B)'-1 | 0.4 | 90<5> | 55<21> | 550 | 700 | D | D |

From the results shown in Table 4, it is proved that the black colored polymerizable compositions of the Examples, each containing an organic acid anhydride having a molecular weight of 300 or lower ((B)-1 to (B)-5, (B)-8 and (B)-9), exhibit a high initial exposure sensitivity and substantially no reduction sensitivity after being heated over time, thereby showing favorable storability of the colored polymerizable composition. The initiator remaining ratio % of the polymerizable compositions of each of the Examples is high, and the hydrolysis ratio % is low. In contrast, in the polymerizable compositions of the Comparative Examples, the initiator remaining ratio % is low particularly in the aged samples, and the hydrolysis ratio % is high.

In view of these results, the reason why reduction in sensitivity is not observed in the polymerizable compositions of the Examples is considered to be that hydrolysis of the oxime ester photopolymerization initiator is suppressed.

Furthermore, it is found that the addition of an acid anhydride having a molecular weight of 300 or lower results in a flat pattern having a small surface roughness, and a favorable developability with suppressed generation of development residues at unexposed portions. It is found that the addition of an acid anhydride having a molecular weight of 300 or lower results in an excellent pattern formability. This effect is particularly remarkable when the acid anhydride has a low boiling point.

Example 5

[Production of Full Color Filter]

Colored polymerizable compositions having a blue color and a red color were prepared in the same manner as the preparation of the green colored polymerizable composition A-1, except the green pigment was changed to a blue pigment (mixture of C. I. Pigment Blue 15:6 and a pyrromethene dye (Dye Compound 1 described above), mixed at 30/70 by mass ratio) or a red pigment (C. I. Pigment Red 254), respectively.

The black polymerizable composition D-1 prepared above was applied onto the silicon wafer substrate with the undercoat layer obtained above such that a black polymerizable composition layer having a dry film thickness of 0.6 μm was formed, and was subjected to a heat treatment (pre-baking) using a hot plate at 100° C. for 120 seconds.

Subsequently, the coating film was exposed to light at an exposure dose of 1200 ml/cm² through a lattice pattern mask (lattice width: 0.3 μm) having a 1.5 μm pattern at a wavelength of 365 nm using an i-line stepper exposure device (FPA-300i5+, trade name, manufactured by Canon. Inc.)

Thereafter, the silicon wafer substrate on which the exposed coating film was formed was placed on a horizontal rotating table of a spin shower development device (product type: DW-30, manufactured by Chemitronics Co., Ltd.), and was then subjected to paddle development at 23° C. for 60 seconds with a developer (CD-2000, trade name, manufactured by FUJIFILM Electronics Materials. Co.) A black lattice pattern with open rectangles of 1.2 μm square was formed on the silicon wafer substrate.

On the substrate having the black lattice pattern obtained above, a 1.2×1.2 μm green (G) colored pattern was formed from the colored polymerizable composition A-1 in the same manner as Example 1-1.

Subsequently, a 1.2×1.2 μm blue (B) colored pattern and a 1.2×1.2 μm red (R) colored pattern were formed in the same manner as the green (G) polymerizable composition A-1, thereby obtaining a color filter for a solid-state image sensor.

The obtained full-color filter was observed by an SEM. As a result, all of the patterns had a rectangular shape and were free from pattern defects.

<Production and Evaluation of Solid-State Image Sensor>

A solid-state image sensor was prepared by incorporating the full-color filter obtained in Example 5. It was confirmed that the obtained solid-state image sensor exhibited high resolution and excellent color separation properties.

All publications, patent applications, and technical standards mentioned in this specification are herein incorporated by reference to the same extent as if each individual publication, patent application, or technical standard was specifically and individually indicated to be incorporated by reference.

What is claimed is:

1. A polymerizable composition comprising an oxime ester photopolymerization initiator, an organic acid anhydride having a molecular weight of 300 or less, and a polymerizable compound, wherein the organic acid anhydride comprises a compound represented by the following Formula (5):

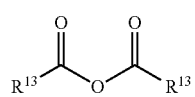

wherein in Formula (5), two of $R^{13}$ are the same as each other and represent an alkyl group having 8 or less carbon atoms or an aryl group having 8 or less carbon atoms.

2. The polymerizable composition according to claim 1, wherein the organic acid anhydride has a boiling point of from 100° C. to 200° C.

3. The polymerizable composition according to claim 1, wherein the mass ratio of the oxime ester photopolymerization initiator to the organic acid anhydride is from 20:1 to 1:1.

4. The polymerizable composition according to claim 1, wherein the oxime ester photopolymerization initiator comprises a compound represented by the following Formula (1):

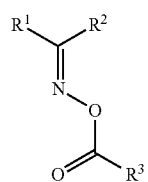

wherein in Formula (1), $R^1$ represents an aryl group, a heteroaryl group or an acyl group; $R^2$ represents an alkyl group, an aryl group, a heteroaryl group or an acyl group; $R^3$ represents an alkyl group, an aryl group or an alkoxy group; and $R^1$ and $R^2$ may form a ring together with at least one oxygen or sulfur atom and at least one divalent organic group.

5. The polymerizable composition according to claim 4, wherein the oxime ester photopolymerization initiator represented by Formula (1) is a compound represented by the following Formula (2):

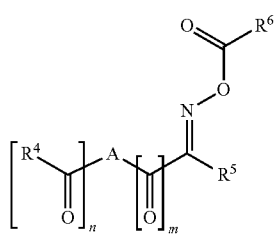

(2)

wherein in Formula (2), A represents an aromatic group or a heteroaromatic group; $R^4$ represents an alkyl group, an aryl group or a heteroaryl group; $R^5$ represents an alkyl group, an aryl group, a heteroaryl group or an acyl group; A and $R^5$ may form a ring together with at least one oxygen or sulfur atom and at least one divalent organic group; $R^6$ represents an alkyl group having 8 or less carbon atoms or an aryl group having 8 or less carbon atoms; n is 0 or 1; and m is 0 or 1.

6. The polymerizable composition according to claim 5,

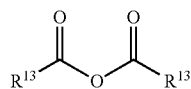

(5)

wherein in Formula (5), the alkyl group or the aryl group represented by $R^{13}$ is the same substituent as $R^6$ in Formula (2).

7. The polymerizable composition according to claim 6, wherein $R^6$ in Formula (2) and $R^{13}$ in Formula (5) are each a methyl group.

8. The polymerizable composition according to claim 4, wherein the oxime ester photopolymerization initiator represented by Formula (1) is a compound represented by the following Formula (3) or Formula (4):

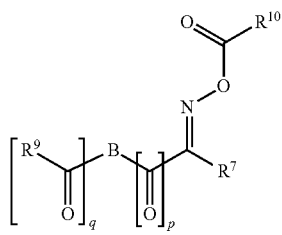

(3)

wherein in Formula (3), $R^7$ represents an alkyl group having a —SAr group; $R^9$ represents an alkyl group, an aryl group or a heteroaryl group; $R^{10}$ represents an alkyl group having 8 or less carbon atoms or an aryl group having 8 or less carbon atoms; Ar represents an aryl group; B represents a substituent selected from the following Group B; p is 0 or 1; and q is 0 or 1;

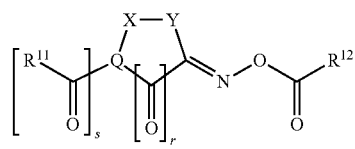

(4)

wherein in Formula (4), X represents a oxygen atom or a sulfur atom; Y represents a divalent alkylene group; $R^{11}$ represents an alkyl group, an aryl group or a heteroaryl group; $R^{12}$ represents an alkyl group having 8 or less carbon atoms or an aryl group having 8 or less carbon atoms; Q represents a substituent selected from Group B from which one hydrogen atom is removed to form a ring together with X-Y; r is 0 or 1; and s is 0 or 1; and wherein in the following Group B, $R^8$ represents an alkyl group or an aryl group:

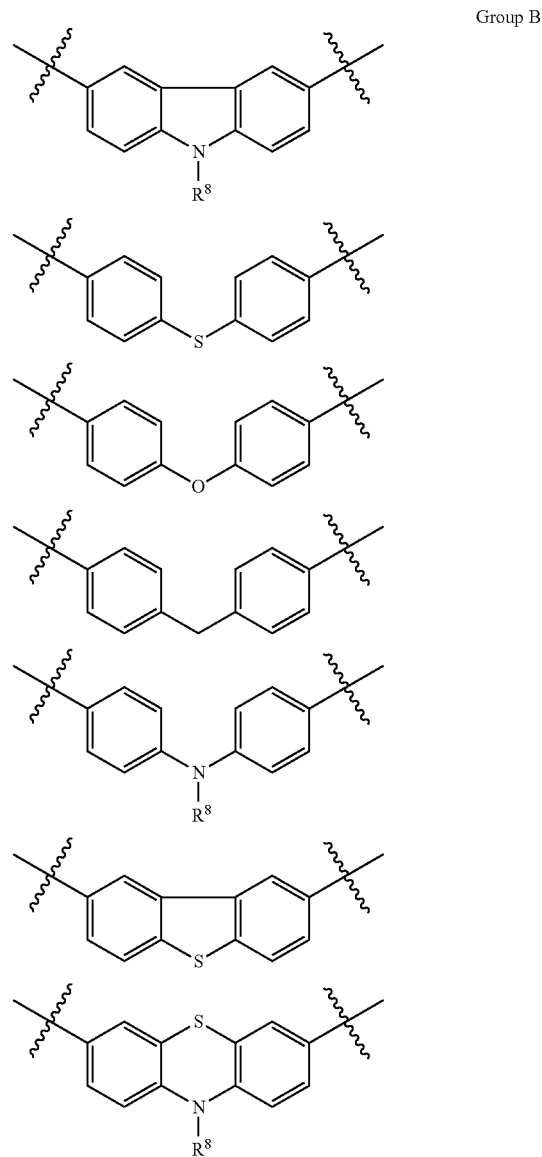

Group B

-continued

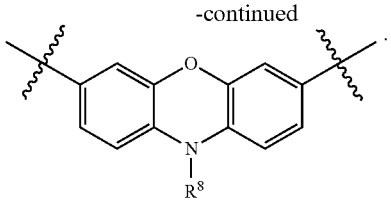

9. The polymerizable composition according to claim 8,

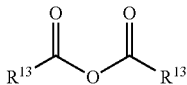

(5)

wherein in Formula (5), the alkyl group or the aryl group represented by $R^{13}$ is the same substituent as $R^{10}$ in Formula (3) or $R^{12}$ in Formula (4).

10. The polymerizable composition according to claim 9, wherein $R^{10}$ in Formula (3) or $R^{12}$ in Formula (4) and $R^{13}$ in Formula (5) are each a methyl group.

11. The polymerizable composition according to claim 1, further comprising a colorant.

12. The polymerizable composition according to claim 11, wherein the colorant comprises a dye.

13. The polymerizable composition according to claim 11, wherein the colorant comprises titanium black.

14. The polymerizable composition according to claim 11, further comprising a dispersant.

15. A cured film formed by using the polymerizable composition according to claim 1.

16. A color filter having a patterned region on a support, the patterned region being formed by using the polymerizable composition according to claim 1.

17. A solid-state image sensor comprising the color filter according to claim 16.

18. A method of producing a color filter, the method comprising:
forming a polymerizable composition layer by applying the polymerizable composition according to claim 1 onto a support;
exposing the polymerizable composition layer to light in a patterned manner; and
forming a colored pattern by developing the exposed polymerizable composition layer.

19. The polymerizable composition according to claim 1, wherein each $R^{13}$ is a methyl group, an ethyl group, an isopropyl group or a phenyl group.

20. The polymerizable composition according to claim 1, wherein each $R^{13}$ is a methyl group.

* * * * *